(12) United States Patent
Southgate

(10) Patent No.: US 12,724,684 B2
(45) Date of Patent: Sep. 1, 2026

(54) ARTIFICIAL INTELLIGENCE MONITORING

(71) Applicant: CrowdStrike, Inc., Sunnyvale, CA (US)

(72) Inventor: Andrew Southgate, Cambridge (GB)

(73) Assignee: CrowdStrike, Inc., Sunnyvale, CA (US)

( * ) Notice: Subject to any disclaimer, the term of this patent is extended or adjusted under 35 U.S.C. 154(b) by 553 days.

(21) Appl. No.: 18/110,456

(22) Filed: Feb. 16, 2023

(65) Prior Publication Data

US 2024/0281352 A1 Aug. 22, 2024

(51) Int. Cl.
*G06F 11/30* (2006.01)
*G06F 11/32* (2006.01)

(52) U.S. Cl.
CPC ........ *G06F 11/3065* (2013.01); *G06F 11/327* (2013.01)

(58) Field of Classification Search
CPC .. G06F 11/3065; G06F 11/327; G06F 21/566; G06N 20/00; H04L 63/1425
See application file for complete search history.

(56) References Cited

U.S. PATENT DOCUMENTS 10,769,570 B2 9/2020 Lu
11,256,989 B2 2/2022 Dalli et al.
2017/0201521 A1* 7/2017 Bruno .................. H04L 63/107
2019/0318100 A1* 10/2019 Bhatia .................. G06F 21/554
2022/0051344 A1 2/2022 Dhuvur et al.
2022/0067520 A1 3/2022 Dalli et al.
2022/0222440 A1 7/2022 Rumman et al.
2022/0335340 A1* 10/2022 Moustafa ............... G06N 20/00
2023/0009127 A1 1/2023 Boyer

FOREIGN PATENT DOCUMENTS

CN 109447048 3/2019
CN 112085214 12/2020
CN 112330475 2/2021
CN 113033374 6/2021

OTHER PUBLICATIONS

European Search Report mailed Jul. 22, 2024 for European Patent Application No. 24157071.2 , 7 pages.
Applicant's response to the Search Opinion submitted Feb. 11, 2025 for European Patent Application No. 24157071.2 , 19 pages.
EPO Communication (Examination Report) for European Patent Application No. 24157071.2, Southgate, "Artificial Intelligence Monitoring," dated Feb. 2, 2026, 6 pages.

* cited by examiner

*Primary Examiner* — Manuel L Barbee
(74) *Attorney, Agent, or Firm* — Law Office of Scott P. Zimmerman, PLLC

(57) ABSTRACT

An artificial intelligence (AI) monitoring service detects, in real time or in near real time, misbehaving AI. The AI monitoring service monitors any of inputs to the AI, incoming/outgoing communications, API calls, inter-service/inter-container activities associated with the AI, and/or an output generated by the AI. Any activity conducted by, or associated with, the AI may be compared to an AI behavior profile defining permissible/impermissible activities. If any activity fails to conform to the AI behavior profile, alerts are sent and threat procedures are implemented. Very early stages of abnormal AI behavior are detected, thus quickly exposing abnormal AI behavior before the artificial intelligence can implement undesirable, or even harmful, actions.

18 Claims, 16 Drawing Sheets

Figure 1:
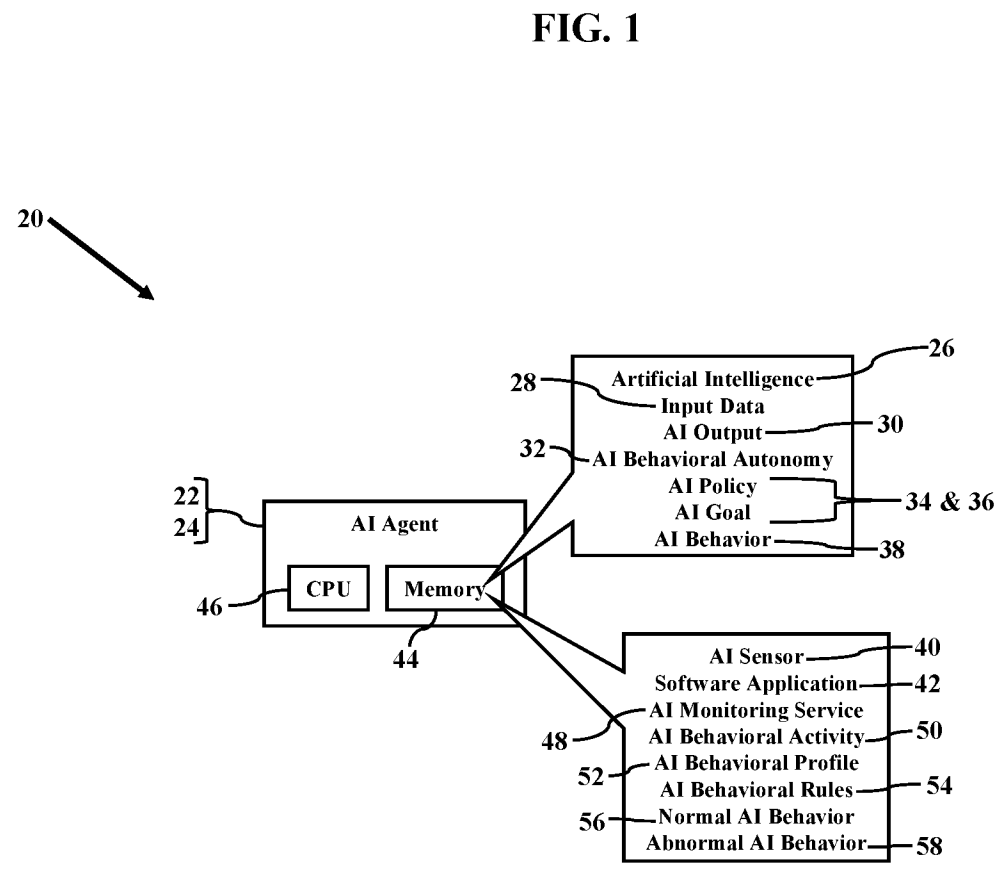

AI Agent

CPU

Memory

22

24

44

46

Artificial Intelligence — 26

Input Data — 28

AI Output — 30

AI Behavioral Autonomy — 32

AI Policy, AI Goal — 34 & 36

AI Behavior — 38

AI Sensor — 40

Software Application — 42

AI Monitoring Service — 48

AI Behavioral Activity — 50

AI Behavioral Profile — 52

AI Behavioral Rules — 54

Normal AI Behavior — 56

Abnormal AI Behavior — 58

Figure 2:
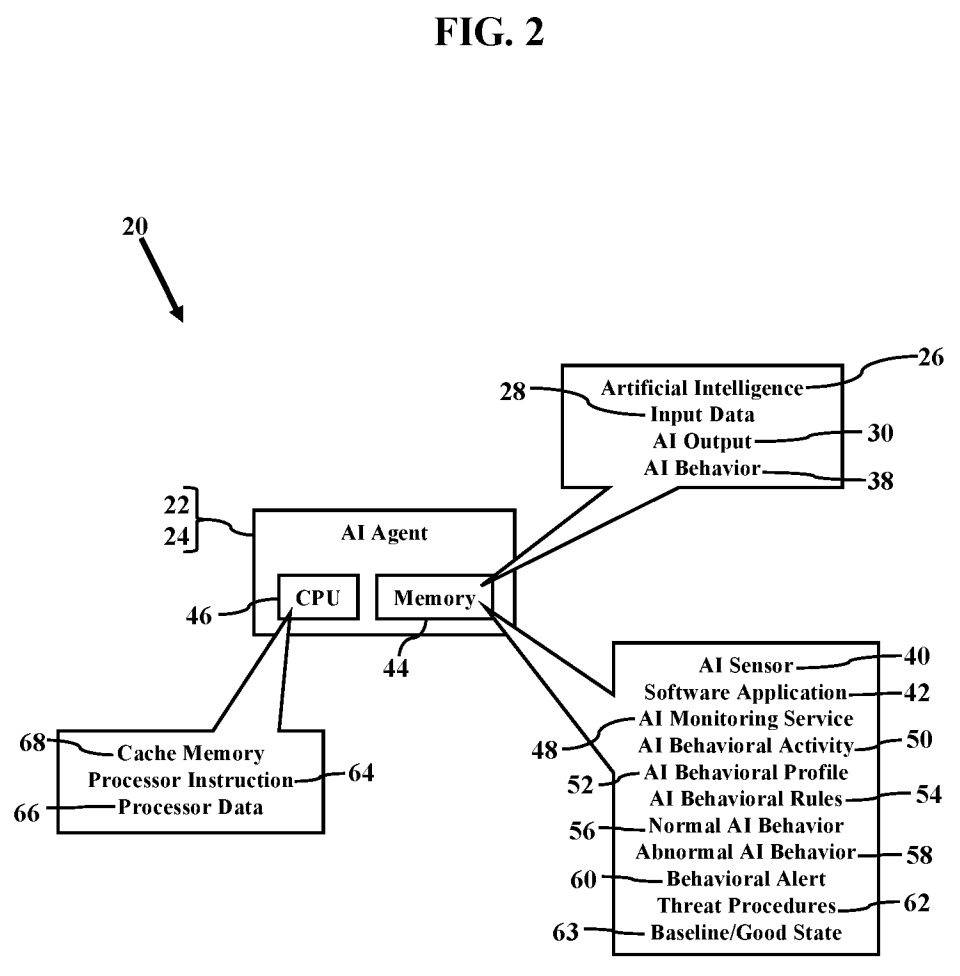

AI Agent 22 24

CPU 46

Memory 44

Artificial Intelligence 26
Input Data 28
AI Output 30
AI Behavior 38

AI Sensor 40
Software Application 42
AI Monitoring Service 48
AI Behavioral Activity 50
AI Behavioral Profile 52
AI Behavioral Rules 54
Normal AI Behavior 56
Abnormal AI Behavior 58
Behavioral Alert 60
Threat Procedures 62
Baseline/Good State 63

Cache Memory 68
Processor Instruction 64
Processor Data 66

FIG. 3

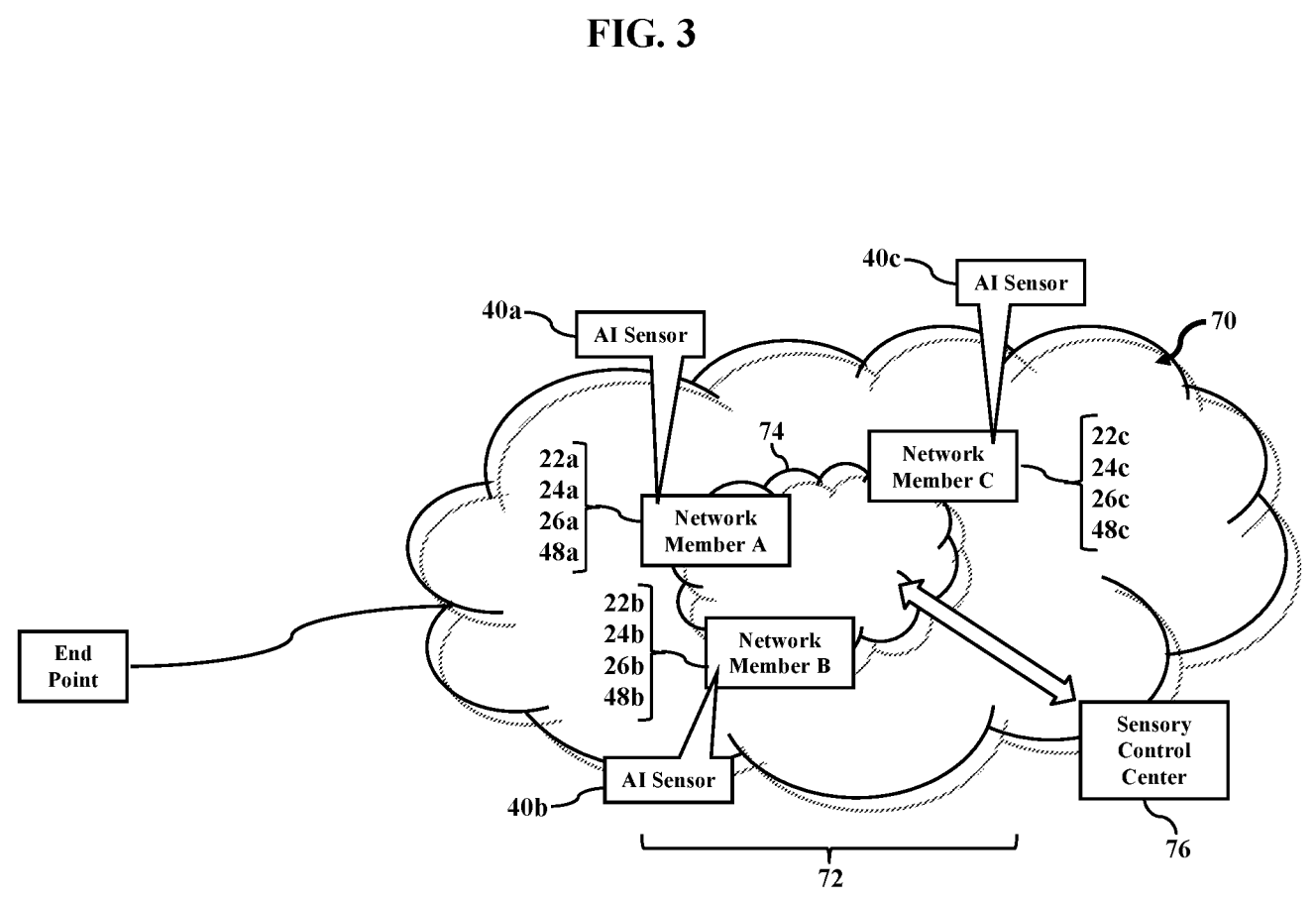

70
AI Sensor
40c
22c
24c
26c
48c
Network Member C
Sensory Control Center
76
74
Network Member A
Network Member B
72
AI Sensor
40a
22a
24a
26a
48a
22b
24b
26b
48b
AI Sensor
40b
End Point

FIG. 5

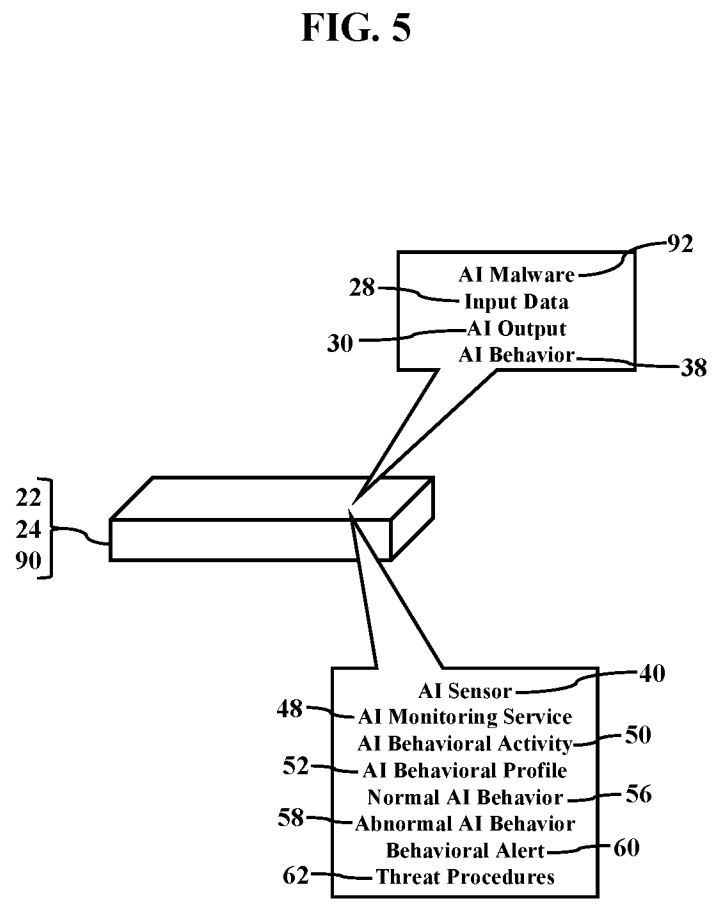

92 AI Malware
28 Input Data
30 AI Output
38 AI Behavior

40 AI Sensor
48 AI Monitoring Service
50 AI Behavioral Activity
52 AI Behavioral Profile
56 Normal AI Behavior
58 Abnormal AI Behavior
60 Behavioral Alert
62 Threat Procedures 22
24
90

FIG. 8

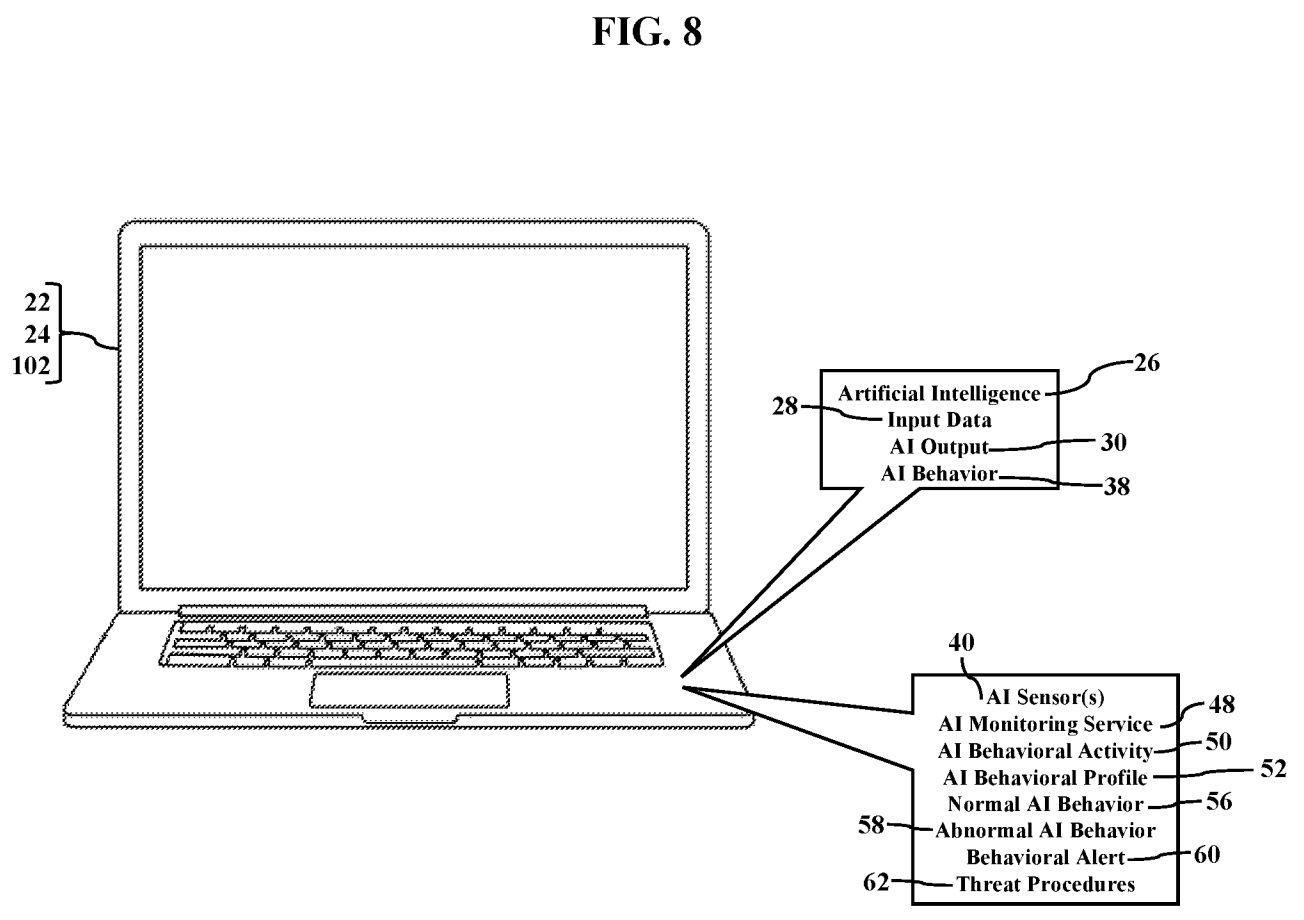

Artificial Intelligence 26
Input Data 28
AI Output 30
AI Behavior 38

AI Sensor(s) 40
AI Monitoring Service 48
AI Behavioral Activity 50
AI Behavioral Profile 52
Normal AI Behavior 56
Abnormal AI Behavior 58
Behavioral Alert 60
Threat Procedures 62

Figure 9:
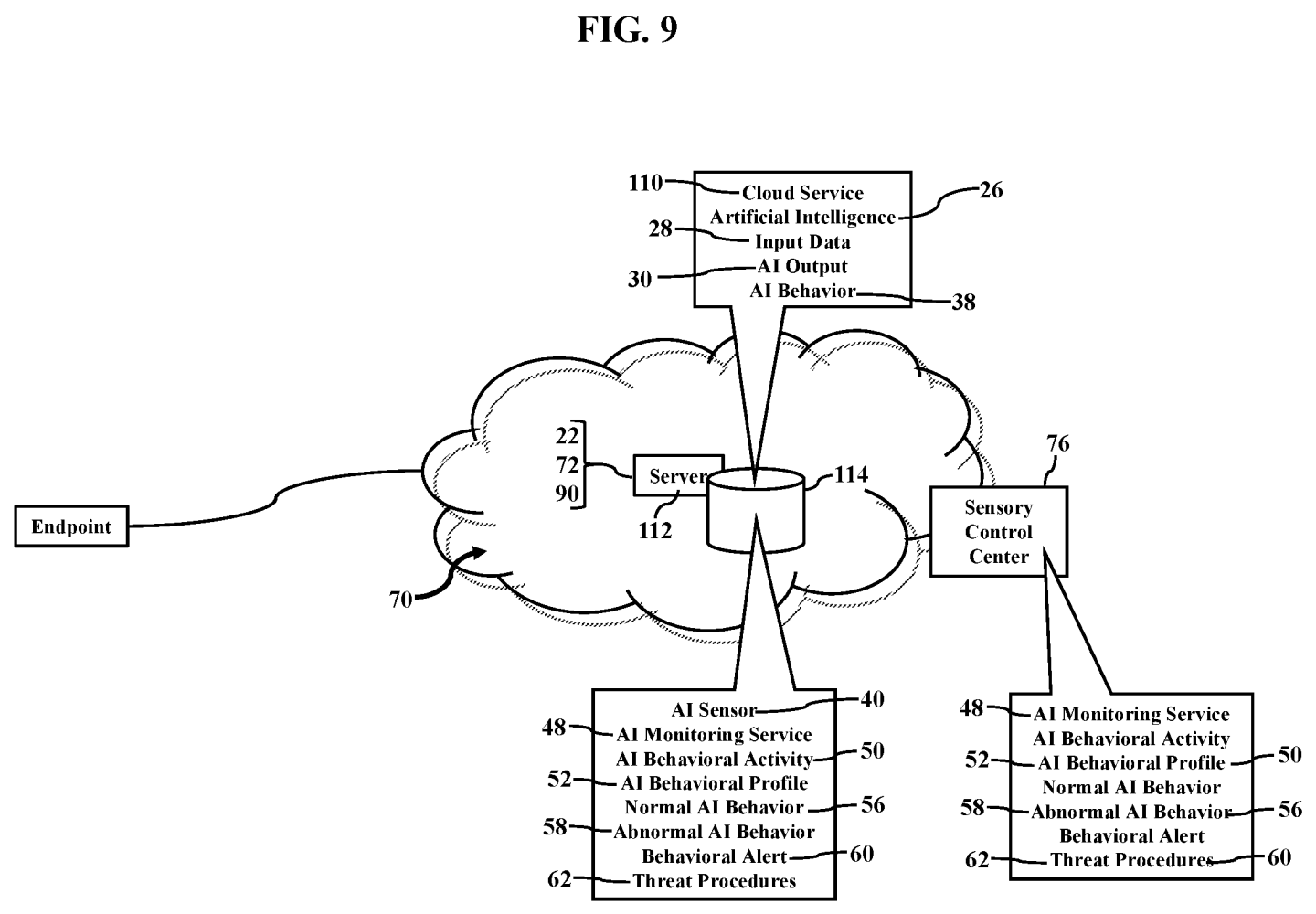

Cloud Service 110
Artificial Intelligence 26
Input Data 28
AI Output 30
AI Behavior 38
Server 112
114
22
72
90
70
Endpoint
Sensory Control Center 76
AI Monitoring Service 48
AI Behavioral Activity 50
AI Behavioral Profile 52
Normal AI Behavior 56
Abnormal AI Behavior 58
Behavioral Alert 60
Threat Procedures 62
AI Sensor 40
AI Monitoring Service 48
AI Behavioral Activity 50
AI Behavioral Profile 52
Normal AI Behavior 56
Abnormal AI Behavior 58
Behavioral Alert 60
Threat Procedures 62

Figure 11:
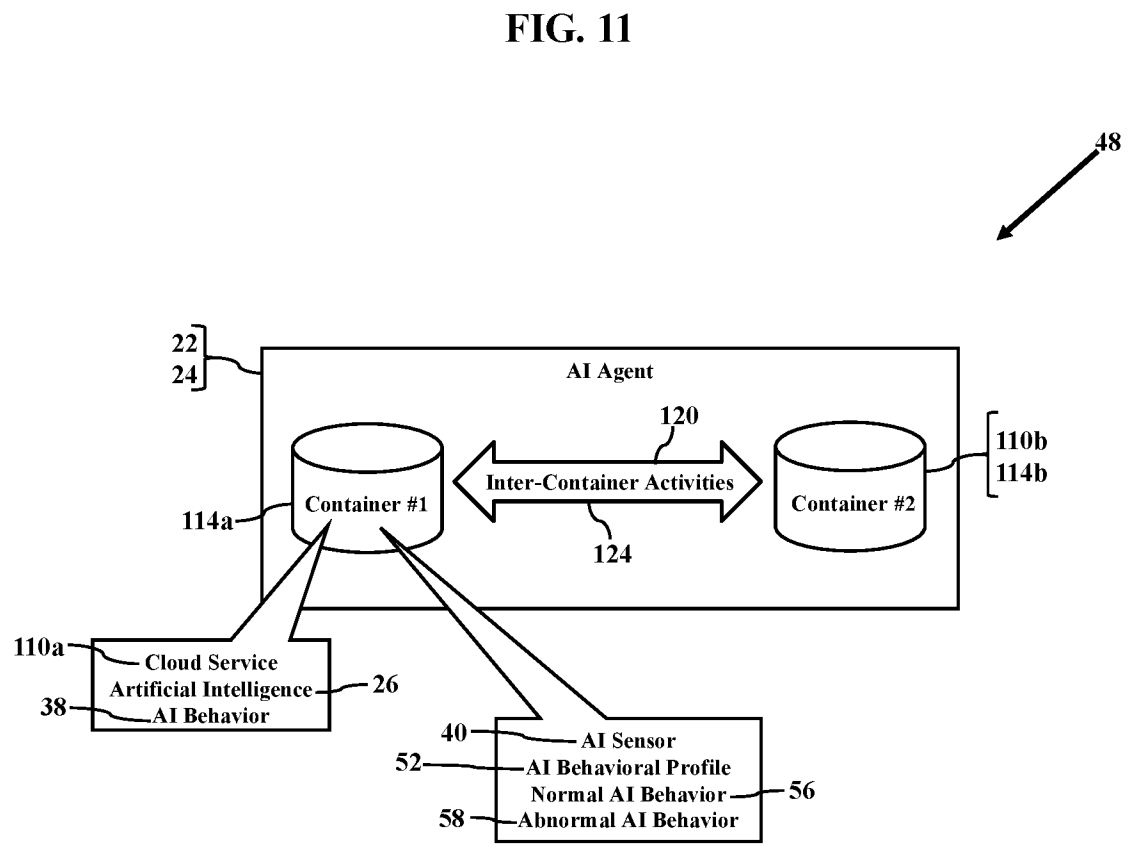

AI Agent 22
24

Container #1

114a

Container #2

110b
114b

Inter-Container Activities

120

124

Cloud Service
Artificial Intelligence
AI Behavior 110a
38
26

AI Sensor
AI Behavioral Profile
Normal AI Behavior
Abnormal AI Behavior 40
52
56
58

Figure 12:
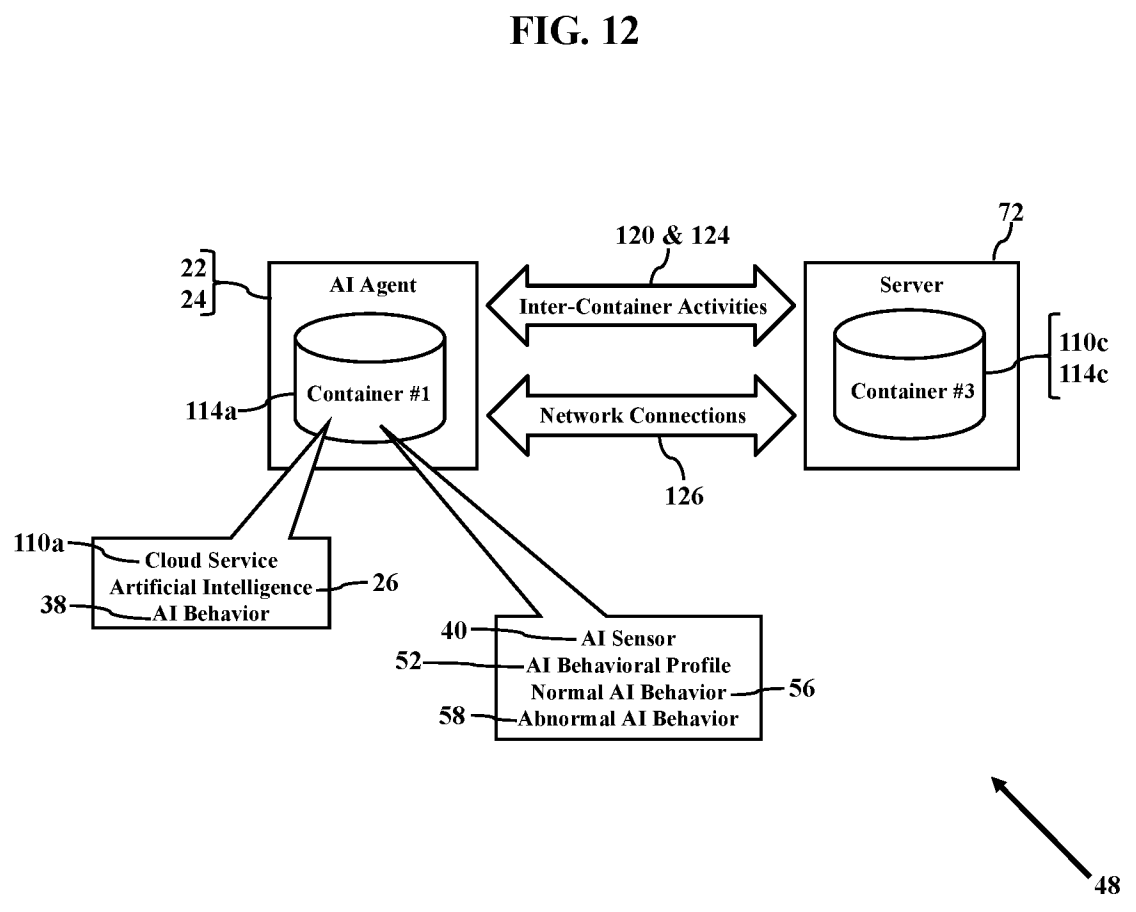

72
Server
Container #3
110c
114c

120 & 124
Inter-Container Activities

126
Network Connections 22
24
AI Agent
Container #1
114a

Cloud Service
Artificial Intelligence
AI Behavior
110a
26
38

AI Sensor
AI Behavioral Profile
Normal AI Behavior
Abnormal AI Behavior
40
52
56
58

FIG. 13

| Technique | Method of operation |
| --- | --- |
| **Pathological output** | This could be as simple as looking for expletives in text output, or for more complex patterns |
| **Unexpected resource usage** | Unusual CPU, GPU or other resource usage could point to malfunction |
| **Malicious input** | Malicious patterns in input strings or data |
| **Suspicious source of input** | Input from unexpected geolocations or the Tor network |
| **AI Agent is fetching data from suspicious internet locations** | If the AI agent is designed to perform web searches, detect it searching for suspicious things |
| **Behavioural patterns known to be suspicious** | The AI agent doing sequences of operations known to be problematic from historical observation |
| **A corrupted or malicious AI agent** | The AI agent itself is not what it should be, possibly due to supply chain attacks |
| **AI Agent being used as a proxy for web requests** | The AI agent being tricked to 'pass on' requests based on its input, to disguise origin |
| **Signals from AI introspection** | AI Introspection data reveals AI is having trouble deciding or has experienced a radical change |

52

ARTIFICIAL INTELLIGENCE MONITORING

BACKGROUND

The subject matter described herein generally relates to computers and, more particularly, the subject matter relates to artificial intelligence.

Artificial intelligence has both promise and pitfalls. Artificial intelligence (or AI) improves efficiencies, reduces costs, and accelerates research and development. AI has already been widely deployed in health care, banking, retail, and manufacturing. As AI grows in usage, though, pitfalls have been discovered. AI can implement unintended consequences, such as biased decisions and inappropriate outputs. As AI becomes even more sophisticated, some fear that AI may act in socially harmful ways.

SUMMARY

A monitoring service determines, in real time or in near real time, evidence of misbehaving artificial intelligence (or AI). AI sensors may be installed to any devices, computers, and networks. The AI sensors provide the monitoring service by monitoring incoming communications, outgoing communications, API calls, and inter-service/inter-container AI behavioral activities conducted by the devices, computers, and networks. If an AI sensor detects evidence of a service anomaly, the AI sensor determines, in real-time or near real time, that abnormal AI behavior is occurring. Notifications may be generated for further investigation. Other threat procedures may be implemented, such as disabling the artificial intelligence. The AI sensors thus quickly expose abnormal AI behavior before the artificial intelligence can implement harmful actions.

BRIEF DESCRIPTION OF THE SEVERAL VIEWS OF THE DRAWINGS

The features, aspects, and advantages of cloud services malware detection are understood when the following Detailed Description is read with reference to the accompanying drawings, wherein:

FIGS. 1-3 illustrate examples of an artificial intelligent (AI) monitoring service;

FIGS. 5-6 illustrate examples of detecting threat actors;

FIGS. 7-8 illustrate more examples of the AI monitoring service;

FIG. 9 illustrates examples of containerized AI monitoring;

FIGS. 10-12 illustrate more examples of the AI monitoring service;

FIG. 13 illustrates more examples for AI behavioral detection techniques;

DETAILED DESCRIPTION

Figure 4:
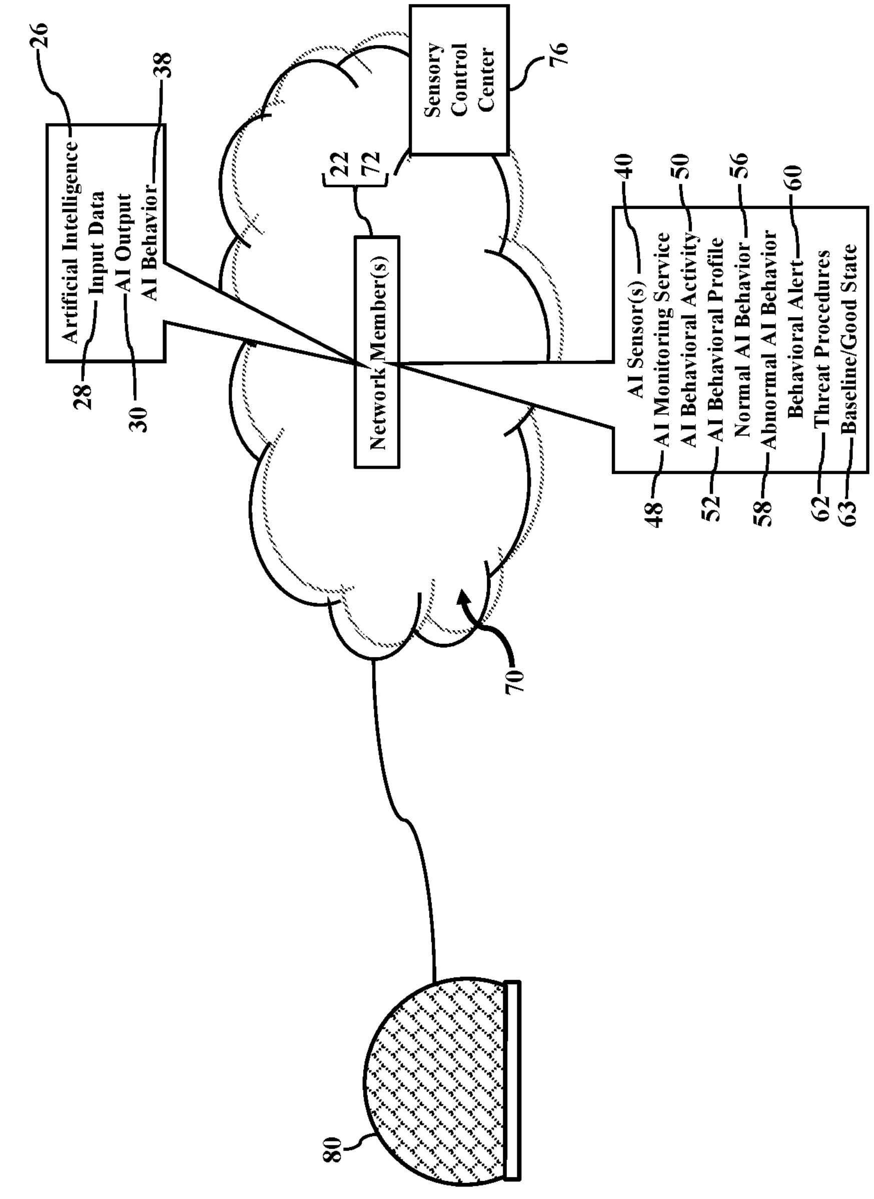
FIG. 4 illustrates more examples of the AI monitoring service.

Some examples relate to revealing misbehaving artificial intelligence. Artificial intelligence (or AI) can be very useful and helpful. AI provides better and faster banking services, website search results, recommended movies and music, and voice control. As AI has been used for good, some AI can misbehave. Sometimes AI can change over time, thus slowly or surprisingly generating undesirable, or even harmful, outputs. Some AI is even intentionally-designed to be harmful, such as AI-powered malicious software. Some examples may thus describe an AI monitoring service that oversees artificial intelligence. If the AI starts misbehaving, the AI monitoring service provides an early warning of AI misbehavior. The AI monitoring service detects even small changes in activities that may indicate the very early stages of abnormal AI behavior. When the AI monitoring service detects these changes, the AI monitoring service may immediately generate alerts that warn of abnormal AI behavior. The AI monitoring service may even implement additional threat procedures, such as disabling the misbehaving artificial intelligence. The monitoring service thus quickly exposes abnormal AI behavior before the artificial intelligence can implement undesirable, or even harmful, actions.

Example techniques may define normal and abnormal AI behavior. Whenever any artificial intelligence (AI) is implemented, an AI behavioral profile may be configured. The AI behavioral profile specifies normal AI behavior and/or abnormal AI behavior. The AI behavioral profile defines permissible/impermissible boundaries, values, or parameters for the operation of the AI. As the AI operates, the examples collect activities conducted by, or associated with, the artificial intelligence. For example, the examples may monitor contemporaneous incoming/outgoing communications, messages, API calls, and inter-service/inter-container activities. Any AI activity may then be compared to the AI behavioral profile that specifies normal/abnormal AI behavior. By comparing the AI activity to the AI behavioral profile, the examples quickly and simply reveal even small changes that indicate the onset of misbehaving artificial intelligence. Once any evidence of abnormal AI behavior is determined, the examples may flag the AI activity. Alerts, escalations, and other threat procedures may be implemented.

AI behavioral monitoring will now be described more fully hereinafter with reference to the accompanying drawings. AI behavioral monitoring, however, may be embodied in many different forms and should not be construed as limited to the examples set forth herein. These examples are provided so that this disclosure will be thorough and complete and fully convey cloud services malware detection to those of ordinary skill in the art. Moreover, all the examples of cloud services malware detection are intended to encompass both structural and functional equivalents thereof. Additionally, it is intended that such equivalents include both currently known equivalents as well as equivalents developed in the future (i.e., any elements developed that perform the same function, regardless of structure).

FIGS. 1-3 illustrate some examples of artificial intelligence (or AI) monitoring 20. An AI agent 22 is a computer system 24 programmed to use artificial intelligence 26 to learn and to make decisions. The artificial intelligence 26, in particular, may mimic human learning and problem-solving. In simple terms, the AI agent 22 receives an input data 28, applies the artificial intelligence 26 to the input data 28, and generates an AI output 30. The AI output 30 may be a prediction, a recommendation, or a sentiment. The banking and finance industries, for example, use the artificial intelligence 26 to detect fraud and to predict creditworthiness. Internet search engines use the artificial intelligence 26 to recommend websites, videos, products, and other electronic content. Cybersecurity firms use the artificial intelligence 26 to detect anomalies and malware. Numerous other companies and industries have implemented the artificial intelligence 26. The artificial intelligence 26 has allowed these companies and industries to transform their processes and products.

The AI agent 22, though, can misbehave. When the AI agent 22 generates the AI output 30, the AI output 30 may be abnormal, undesirable, or even harmful. The artificial intelligence 26, in other words, has caused or allowed the AI agent 22 to act in unpredictable ways. The AI agent 22 may even have AI behavioral autonomy 32 to adapt its policies 34 and/or goals 36. Because the artificial intelligence 26 may change, the AI agent 22 may unpredictably change its AI behavior 38. The AI behavior 38 may change due to unexpected values or quantities of the input data 28. The AI behavior 38 may change due to a corruption in programming. The AI behavior 38 may change due to infection by malicious software. The AI behavior 38 may drift or change as the policies 34 and/or goals 36 evolve. Whatever the reason, the AI agent 22 may thus generate an unforeseen or unintended output 30. This unpredictable AI behavior 38 may be present at inception, or the unpredictable AI behavior 38 may spontaneously arise.

FIG. 1 thus illustrates an example of the artificial intelligence (or AI) monitoring 20. An AI sensor 40 monitors, and may even control, the artificial intelligence 26 applied or implemented by the AI agent 22. FIG. 1 illustrates the AI sensor 40 as a software application 42 stored to a memory device 44 of the AI agent 22, and a hardware processor 46 (illustrated as "CPU") reads and executes the software application 42. The software application 42, representing the AI sensor 40, provides an AI monitoring service 48. The AI monitoring service 48 determines the AI behavior 38 of the artificial intelligence 26. That is, the AI sensor 40 determines whether the artificial intelligence 26 is operating or acting as expected/desired or as unforeseen/unintended. The AI sensor 40, for example, may receive or intercept information describing the input data 28 received by the AI agent 22. The AI sensor 40 may also receive or intercept the AI output 30 generated by the artificial intelligence 26 and/or the AI agent 22. The AI sensor 40 may also receive or intercept AI behavioral activities 50 conducted by, or associated with, the artificial intelligence 26 executed by the AI agent 22. The AI sensor 40 gathers any, some, or all of this information as behavioral indicators.

The AI sensor 40 may then determine the AI behavior 38. The AI sensor 40 collects any of the input data 28, the AI behavioral activities 50, and the output 30. The AI sensor 40 may then determine the AI behavior 38 of the AI agent 22. The AI sensor 40, for example, may compare any of the input data 28, the AI behavioral activities 50, and/or the output 30 to an AI behavioral profile 52. The AI behavioral profile 52 may contain or describe logical statements (such as AI behavioral rules 54) representing or defining permissible/impermissible boundaries, values, or parameters of the AI behavior 38. The AI behavioral profile 52 may have been generated by, or consist of, in part or wholly, one or more machine learning model(s) trained to detect good/bad behavior. However the AI behavioral profile 52 is defined or generated, if the AI behavior 38 (e.g., any of the input data 28, the AI behavioral activities 50, and/or the output 30) lies within acceptable ranges or values specified by the AI behavioral profile/rules 52/54, then the AI sensor 40 may classify or decide a normal AI behavior 56. The AI agent 22, in other words, is acting as intended or as expected. However, if the AI behavior 38 lies outside, or exceeds, or is greater/less than the acceptable ranges/values/boundaries/parameters specified by the AI behavioral profile/rules 52/54, then the AI sensor 40 may classify or determine an abnormal AI behavior 58. The AI agent 22 may thus be unintentionally or unexpectedly behaving, and further investigation is required.

FIG. 2 illustrates examples of improved computer functioning. When the AI sensor 40 determines the normal AI behavior 56, the AI sensor 40 may approve or authorize the AI output 30. The AI sensor 40, for example, may permit or allow the AI agent 22 and/or the artificial intelligence 26 to release the AI output 30 from a memory quarantine (such as the memory device 44). The AI sensor 40 may also approve the AI agent 22 and/or the artificial intelligence 26 to send the AI output 30 to a destination network/IP address. However, when the AI sensor 40 decides or determines that the abnormal AI behavior 58 is observed, the AI agent 22 may be applying the artificial intelligence 26 in an unintentional or unexpected manner, perhaps even generating an undesirable or even harmful AI output 30. The AI sensor 40 may thus generate and send an AI behavioral alert notification 60 to any notification/IP addresses that initiate or escalate review. The AI behavioral alert notification 60 may be any message, webpage/website/social posting, and/or SMS text. The AI behavioral alert notification 60 warns recipient systems/devices/personnel that the artificial intelligence 26 is abnormally behaving.

FIG. 2 illustrates more examples of improved computer functioning. When the AI sensor 40 detects the abnormal AI behavior 58, the AI sensor 40 may also implement predefined AI threat procedures 62. The AI threat procedures 62 protect or isolate the AI agent 22 from implementing unintended consequences and even social, commercial, and/or physical harms. The AI sensor 40, for example, may reset, or roll-back, the artificial intelligence 26 to an original/baseline state or to a previously known/stored "good" state 63 of operation/settings. The AI sensor 40 may additionally or alternatively pause, stop, halt, or terminate any processor instruction 64 or processor data 66 currently being executed by the hardware processor 46. While the processor instruction 64 and the processor data 66 may have any RAM/ROM/Disk/Main memory storage location, FIG. 2 illustrates processor cache memory 68 (such as Level 1-3 data and instruction cache memory). The AI sensor 40 may thus instruct the AI agent 22, and/or the hardware processor 46, to stop or even delete any processor instruction 64 or processor data 66 queued for execution in the processor's cache memory 68. In short, the AI sensor 40 proactively monitors the AI behavior 38 of the AI agent 22 and prevents the artificial intelligence 26 (and the hardware processor 46) from implementing socially/commercially/physically harmful actions, policies, or goals.

FIG. 3 illustrates cloud deployment and control. Instances of the artificial intelligence (or AI) sensor 40 may be distributed in a cloud-computing environment 70. Because the AI sensor 40 may be implemented as the software application 42 (illustrated in FIG. 2), the AI sensor 40 may be downloaded and installed to any computer network member 72 operating within, or affiliated with, the cloud-computing environment 70. FIG. 3, for example, illustrates multiple instances of the AI sensor 40 deployed to servers, switches, routers, and other network members 72. Because the network members 72 communicate via a communications network 74, each AI sensor 40 may be programmed to provide the cloud-based, or cloud-native, AI monitoring service 48 to the network members 72 of the cloud-computing environment 70. The AI sensors 40 may thus be distributed to endpoints and to the network members 72 to observe, stimulate, and even control any artificial intelligence 26 utilized by the cloud-computing environment 70. Should any AI sensor 40 detect the abnormal AI behavior 58 (illustrated in FIG. 2), the AI sensor 40 may generate and send the behavioral alert notification 60 and/or implement the predefined threat procedures 62 (as previously explained with reference to FIG. 2). Various implementations of a cloud-computing environment 70 are possible and could be used in the examples herein described.

FIG. 3 also illustrates a sensory control center 76. Because the AI sensors 40 may be deployed throughout the cloud computing environment 70, the AI sensors 40 may communicate via the communications network 74 with the sensory control center 76. As the AI sensors 40 provide the AI monitoring service 48 to the network members 72, each AI sensor 40 may report its corresponding input data 28, the AI behavioral activities 50, the output 30, and/or the AI behavior 38 to the network address associated with the sensory control center 76. The sensory control center 76 may thus receive field reports and behavioral updates from the AI sensors 40 deployed throughout the cloud computing environment 70. A service provider of the AI monitoring service 48 may thus provide the AI sensors 40 for installations to a customer's network members 72. The sensory control center 76 may thus be supplied and maintained by the service provider of the AI monitoring service 48 and the AI sensors 40. The sensory control center 76 may thus be a network of computers that monitor and oversee the operations of the AI sensors 40. The AI sensors 40 mesh and act together as a single integrated detection, visibility and protection system. The sensory control center 76 may also provide a graphical user interface (such as a web application) for users to view status and results of the AI monitoring service 48. The web application may also provide remote control of the actions taken by the deployed AI sensors 40.

Any threat notification scheme may be used. When the AI monitoring service 48 detects the abnormal AI behavior 58, the AI monitoring service 48 may implement the threat procedures 62. The AI monitoring service 48, for example, may instruct its host machine to generate and to send the behavioral alert notification 60 to predefined notification addresses. The behavioral alert notification 60 may be any message, webpage/website/social posting, and/or SMS text. Whatever the notification method, the behavioral alert notification 60 may have any electronic content describing the abnormal AI behavior 58. The AI monitoring service 48 may be programmed or coded to include far more detailed escalation actions.

The AI sensor 40 may include anti-tamper measures. The AI sensor 40 may have programming, switches, and/or sensors to detect whether it is being tampered with or whether attempts are being made to disable or remove it. Should the AI sensor 40 detect gravity tilt, GPS locational change, opening door panel, change/loss of signal, change/loss of electrical power, or any other tamper indication, the AI sensor 40 may generate and send alert notifications and implement other threat procedures, as for misbehavior. This tamper response can trigger if either if the AI agent 22 itself, or other means, are being used to tamper with the AI sensor 40. Indeed, the abnormal AI behavior 58 itself may be an indication of malicious physical or software tamper.

The AI sensor 40 may be an "on premises" installation. The AI sensor 40 may be a software package that a customer installs to its servers/devices/computers or in its private cloud computing environment 70. The AI sensor 40, however, may be a physical component or appliance that the customer installs to, or interfaces with, its servers/devices/computers. In all of these types of deployment situations, the AI sensor 40 (whether an appliance or software) can also communicate with true cloud components if or as required. This arrangement supplies the same AI monitoring service 48 but can offer more privacy or meet compliance rules for the customer.

FIG. 4 illustrates more examples of the artificial intelligent (AI) monitoring service 48. Here again the AI sensors 40 monitor computer systems 24 utilizing the artificial intelligence 26. FIG. 4, though, illustrates a virtual personal assistant 80. The virtual personal assistant 80 (such as Amazon's ALEXA® smart speaker) receives a user's spoken audio. The virtual personal assistant 80 then cooperates with the cloud-computing environment 70 to learn the user's preferences. The artificial intelligence 26 may involve natural language processing, machine learning, and content selection. The virtual personal assistant 80 cooperates with the cloud-computing environment 70 to generate the output 30, such as the user's preferred music or movies, light settings, HVAC controls, and other tasks.

Unfortunately, though, misbehaviors have been reported. The virtual personal assistant 80 is known to have security vulnerabilities, such as microphone privacy risks and malicious skills. The virtual personal assistant 80 has been known to output inappropriate voices. As the artificial intelligence 26 grows in usage and in sophistication, more unintended consequences, and more security threats, are expected. These unforeseen AI behaviors 38 damage goodwill and require urgent resolution.

In FIG. 4, though, the AI sensors 40 monitor the artificial intelligence 26. The AI sensors 40 may be distributed throughout the cloud-computing environment 70. The AI sensors 40 monitor any network members 72 participating in, or providing aspects of, the artificial intelligence 26. The AI sensor 40 may also be installed to clients and to endpoint devices (such as the virtual personal assistant 80). Any AI sensor 40 collects its host's corresponding input data 28, the corresponding output 30, and the corresponding behavioral activities 50. Each AI sensor 40 may then use the information to determine the corresponding AI behavior 38. If, for example, any sensed data or information conforms to the AI behavioral profile 52, then the AI sensor 40 determines or classifies the normal AI behavior 56. The AI sensor 40 may thus permit, approve, or authorize its corresponding host to generate and/or send the output 30. However, if the sensed data or information fails to conform to the AI behavioral profile 52, then the AI sensor 40 determines or classifies the abnormal AI behavior 58. The AI sensor 40 may generate and send the AI behavioral alert 60 and/or implement the threat procedures 62. The AI sensor 40 may disable the artificial intelligence 26. The AI sensor 40 may reset, or roll-back, the artificial intelligence 26 to the original/baseline state or to a previously known/stored "good" state (illustrated as reference numeral 63). The AI sensor 40 may deny or stop the host from generating and/or sending the output 30. The AI sensor 40, in other words, may halt or disable its corresponding host from generating or sending the output 30. The AI sensor 40 may thus have a final approval or authorization over the artificial intelligence 26.

The AI sensor(s) 40 may thus function as AI gatekeepers. As the AI agent 22 operates, the AI sensor 40 confines the AI behavior 38 to the predefined AI behavioral profile 52. The AI behavioral profile 52 logically defines behavioral boundaries for permissible and impermissible AI behavior 38. If any data, information, or the output 30 crosses or exceeds the predefined behavioral boundaries, then the AI sensor 40 may, in real time or in near real time, may halt, stop, terminate, or abandon any programming statement, routine, call, current task, or potential/future output 30. The AI sensor 40 thus prevents unexpected or unwanted AI behaviors 38, such as stopping an inappropriate bedtime voice, offensive content, or a dangerous challenge. The AI sensor 40 may further send the behavioral alert notification 60, thus warning a service provider or other responsible party of the attempted abnormal AI behavior 58.

The AI sensor 40 provides improvements to computer functioning. The AI agent 22 applies the artificial intelligence 26 to learn and to make decisions. As this disclosure explains, though, the artificial intelligence 26 may cause the AI agent 22 to implement tasks or actions that are unintended, unexpected, or even pathological. The artificial intelligence 26, in other words, may instruct the hardware processor 46 (illustrated in FIG. 2) to execute instructions or operations that cause social/commercial/physical harm. The AI sensor 40, however, oversees the artificial intelligence 26 and the operations of the hardware processor 46. When the AI sensor 40 determines the abnormal AI behavior 58, the AI sensor 40 may terminate or disable the abnormal AI behavior 58. When the AI sensor 40 determines the abnormal AI behavior 58, the AI sensor 40 may instruct the hardware processor 46 to halt or terminate any current, queued, or stored instruction 64 or data 66 (illustrated in FIG. 2). The AI sensor 40 may quarantine the output 30 and, when the abnormal AI behavior 58 is identified, forbid the output 30 from being transferred out of the quarantine. The AI sensor 40 may delete the output 30 from the quarantine to prevent transfer. The AI sensor 40 may further improve computer functioning by resetting, or rolling-back, the artificial intelligence 26 to an original/baseline state or to a previously known/stored "good" state 63. The AI sensor 40 may further improve computer functioning by generating and sending the behavioral alert notification 60 to alert of the abnormal AI behavior 58. The AI sensor 40 may further improve computer functioning by executing the predefined threat procedures 62.

Cloud-based aggregation also improves computer functioning. The AI sensors 40 may be distributed among the endpoints and/or the network members 72 affiliated with the cloud-computing environment 70. This distributed architecture prevents any endpoint (such as the virtual personal assistant 80) and any network member 72 from executing/implementing the abnormal AI behavior 58. The AI sensors 40 may detect the abnormal AI behavior 58 using historical pattern matching or abnormal/impermissible data values. Because some of the AI monitoring service 48 may be provided by the cloud-computing environment 70, the AI agent 22 is prevented from probing or disabling behavioral detection without attracting cloud attention. Moreover, the cloud-based AI monitoring service 48 may adapt to changes in the AI behavior 38 of the AI agent 22, following direction/control from the cloud-computing environment 70. The AI monitoring 20 thus provides visibility of, and insight into, the AI behavior 38 for monitoring, investigation and post-event analysis.

Figure 6:
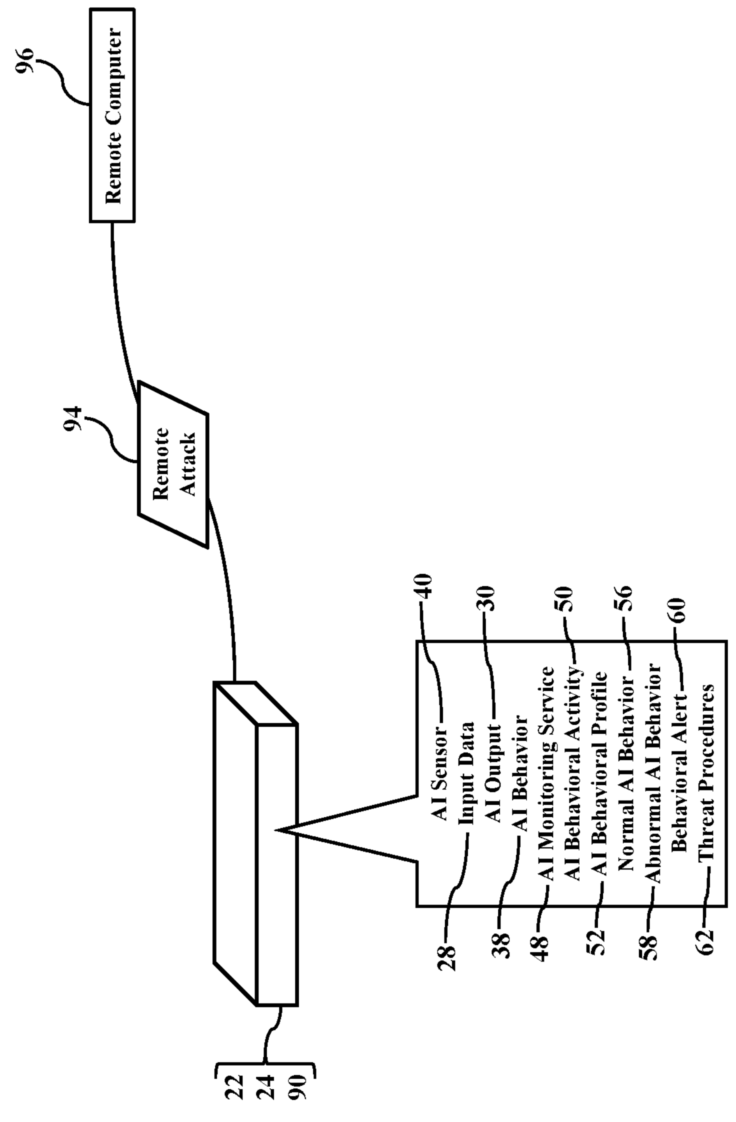

FIGS. 5-6 illustrate examples of threat actor detection. While the AI agent 22 may be any computer system 24, FIGS. 5-6 illustrate a computer rack server 90. Because the AI agent 22 stores/hosts the AI sensor 40, the AI sensor 40 may detect evolving or here-to-fore unseen attacks. FIG. 5, for example, illustrates AI-powered malware 92. The AI-powered malware 92 is malicious software that was machine designed or learned (perhaps with human involvement or interaction) to change or transform and to evade or obfuscate detection. Because the AI sensor 40 monitors the input data 28, the output 30, and the AI behavioral activities 50, the AI sensor 40 detects any abnormal AI behavior 58, regardless of source or cause. So, even though the AI-powered malware 92 may be heretofore unknown, the AI sensor 40 need not rely on pattern-matching behavioral analysis. The AI-sensor 40 may detect the AI-powered malware 92 using the AI behavioral profile 52 defining either or both of the normal AI behavior 56 and the abnormal AI behavior 58. Similarly, as FIG. 6 illustrates, the AI sensor 40 may also detect a remote attack 94 sent or initiated by a remote computer 96. Even if the remote attack 94 is heretofore unknown (e.g., an unseen pattern), the AI-sensor 40 will detect the abnormal AI behavioral activities 50 that indicate the abnormal AI behavior 58. The AI sensor 40 may immediately generate and send the behavioral alert notification 60. The AI sensor 40 may also implement any other threat procedures 62 (such as halt/terminate/purge any processor instructions 64 or data 66, or quarantine/delete the output 30, as explained with reference to FIG. 2).

The remote attack 94 may include malicious attacker-controlled AI agent software. The malicious attacker-controlled AI agent software can be installed, by the attacker as part of the attack, and replicate itself onto customer systems. The AI agent 22 can further replicate itself to other customer systems once established on the first, using its own inbuilt techniques and applying its AI to succeed and evade countermeasures. This is the focus of the idea of AI agents 22 that can adapt to their environment, as the malicious agent probes, finds weaknesses in and adapts to its environment. The AI sensor 40 can detect, restrict or prevent this, or remediate the problem by removing the malicious AI agent(s).

Figure 7:
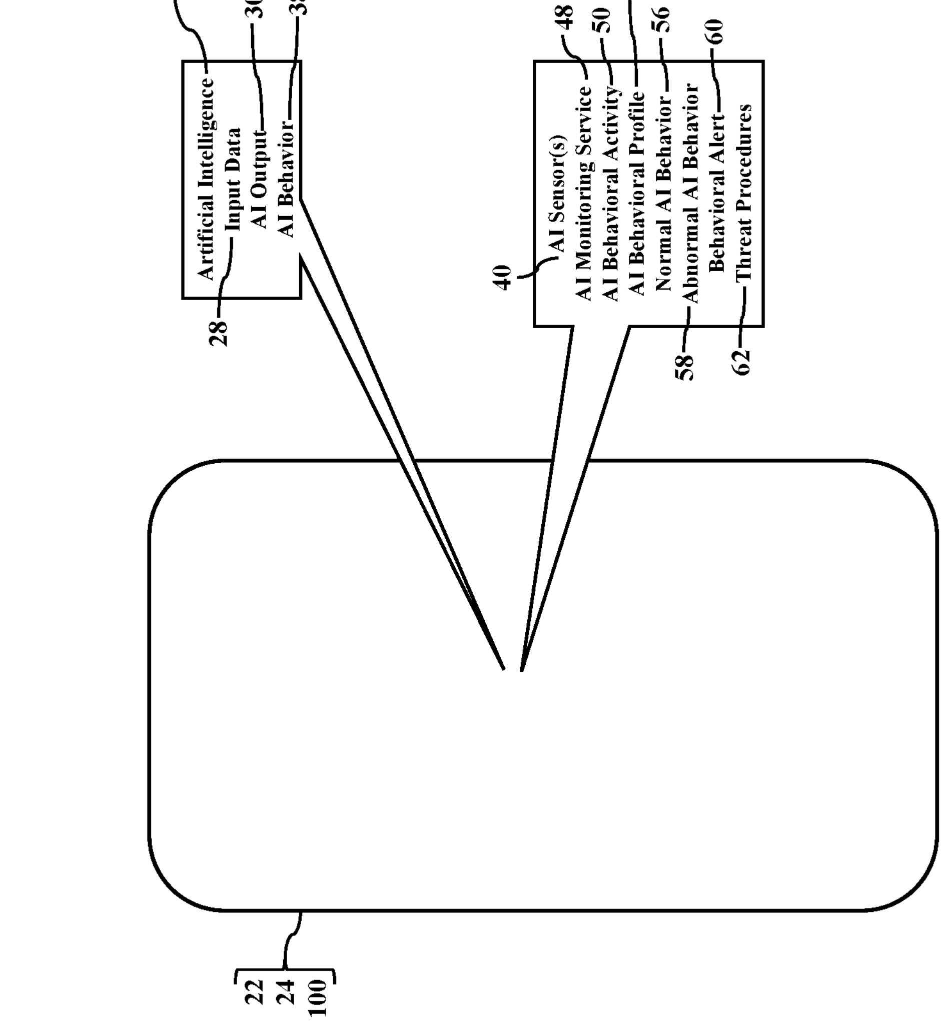

FIGS. 7-8 illustrate more examples of the artificial intelligence (or AI) monitoring service 48. FIG. 7 illustrates the AI agent 22 as a mobile smartphone 100, while FIG. 8 illustrates the AI agent 22 as a mobile laptop 102. The artificial intelligence (or AI) monitoring service 20 may thus oversee and control any artificial intelligence 26 applied to mobile computing. The AI sensor 40 may be downloaded and installed to any mobile computing device (such as the smartphone 100 or the mobile laptop 102). Instances of the AI sensor 40 may also be distributed to the computer network members 72 operating within, or affiliated with, the cloud-computing environment 70 (as illustrated with reference to FIGS. 3-4). Each AI sensor 40 collects any of its corresponding input data 28, the output 30, and the AI behavioral activities 50. The AI sensor 40 determines the corresponding AI behavior 38 and compares to the corresponding AI behavioral profile 52. If any data or information satisfies or conforms to the AI behavioral profile 52, then the AI sensor 40 may classify the corresponding AI behavior 38 as the normal AI behavior 58. However, should any data or information fail to conform to the AI behavioral profile 52, then the AI sensor 40 may classify the AI behavior 38 as the abnormal AI behavior 58, send the behavioral alert notification 60, and/or implement the threat procedures 62. So, whatever the computer system 24, the AI sensor 40 (providing the AI monitoring service 48) may approve or deny the AI input data 28, the AI output 30, and the AI behavioral activity 50. The AI sensor 40 may thus have the final approval or authorization over the artificial intelligence 26.

FIG. 9 illustrates examples of containerized AI monitoring. The artificial intelligence (AI) sensor 40 monitors the actions and decisions made by the AI agent 22. Again, while the AI agent 22 may be any processor-controlled computer system 24, FIG. 9 again illustrates the server 90. The server 90 may thus be one of the network members 72 operating within, or affiliated with, the cloud-computing environment 70. The server 90 is programmed to provide a cloud service 110 within the cloud-computing environment 70. The cloud service 110 may be executed by, or associated with, a virtual machine 112. The cloud service 110 may be packaged as an isolated software container 114 that contains all of the necessary elements (such as the artificial intelligence 26) to provide the cloud service 110. The cloud service 110, for simplicity, may thus be known as an AI containerized service 110 and 114. The cloud-computing environment 70 delivers hosted cloud-native services, like storage, servers, and application services, via communications networks (such as the Internet). Various implementations of a cloud-computing environment 70 are possible and could be used in the examples herein described.

The server 90 may also store and execute the AI sensor 40. Because the AI containerized service 110 and 114 utilizes the artificial intelligence 26, the AI sensor 40 provides the AI monitoring service 48 on behalf of a service provider. While the AI sensor 40 may have any memory storage location, FIG. 9 illustrates a containerized architecture. The AI sensor 40 may thus be added to, and packaged with, the software container 114. The AI sensor 40 monitors the artificial intelligence 26 applied as a feature or component of the cloud service 110. The AI sensor 40 monitors the input data 28 received by the cloud service 110 and/or by the artificial intelligence 26. The AI sensor 40 receives the AI behavioral activities 50 conducted by, or associated with, the cloud service 110 and/or the artificial intelligence 26. The AI sensor 40 receives the output 30 generated by the cloud service 110 and/or by the artificial intelligence 26. The AI sensor 40 compares any of the input data 28, the AI behavioral activities 50, and/or the output 30 to the AI behavioral profile 52. The AI sensor 40 may also report, upload, or offload any of the input data 28, the AI behavioral activities 50, and the output 30 to the sensory control center 76 for analysis. If any, some, or all of the data or information conforms to the AI behavioral profile 52, then the AI monitoring service 48 (e.g., the AI sensor 40 and/or the sensory control center 76) may classify the normal AI behavior 56. However, should any, some, or all of the data or information fail to satisfy or conform to the AI behavioral profile 52, then the AI monitoring service 48 may determine or classify the abnormal AI behavior 58. So, whatever the cloud service 110, the AI monitoring service 48 may thus have final approval or authorization over the artificial intelligence 26 applied by the cloud service 110.

The examples may be applied to any type or class of the AI agent 22. The artificial intelligence (or AI) monitoring service 48 classifies both useful and malicious AI agents 22. Useful AI agents 22 are performing as expected. That is, a service provider, a subcontractor, or an end user/customer may deploy the AI sensor(s) 40 to validate, ensure, and attest that the AI agent 22 continues to behave normally. However, the AI sensor 40 may also identify or reveal the AI agent 22 that was once useful, but the AI agent 22 has since learned a wrong policy 34 or goal 36 (illustrated in FIG. 1) and is abnormally behaving, perhaps even pathologically behaving. The abnormal AI behavior 58 may be caused by malfunction, attack, or manipulation. The AI sensor 40 may also identify or reveal the AI agent 22 that is malicious by intentional design. The AI sensor 40, in other words, may detect the AI-powered malware 92 (illustrated in FIG. 5) or the remote attack 94 (illustrated in FIG. 6) from remote agents that can adapt to their environment. The AI sensor 40 may also detect a so-called hybrid AI agent 22 that applies the artificial intelligence 26 in conjunction with human input and guidance. The AI monitoring service 48 detects useful and benign, corrupted, and malicious artificial intelligence 26.

More examples of the artificial intelligence (or AI) monitoring service 48 are provided. Suppose a service provider implements a highly-capable AI customer support system. The AI customer support system may be a software bot that uses voice response software. The AI sensor 40 may be deployed within the AI customer support system to monitor and record the input 28 and output 30 of that software bot. The AI sensor 40 thus observes and monitors how the software bot evolves over time, and the AI sensor 40 may control and disable the software bot, if necessary, to ensure that the software bot does not damage business. As another example, suppose the AI customer service software bot is programmed with the goal 36 of 5-star customer reviews. The AI customer service software bot may then learn from customer feedback and incorrectly implement scripts biased to elicit the 5-star reviews. Because the AI sensor 40 maintains event logs describing the input data 28, the AI behavioral activities 50, and the output 30, the event logs may be compared to historical patterns in the abnormal AI behavior 58.

Still more examples illustrate the artificial intelligence (or AI) monitoring service 48. Suppose a company is developing leading-edge AI. The company may deploy the AI sensor(s) 40 to satisfy monitoring, accreditation, and compliance efforts. The AI sensor(s) 40 may also provide a second source that verifies the AI 26 is safe to deploy. As another example, suppose the company operates in a regulated industry that is subject to compliance requirements. Even though the company uses the artificial intelligence 26, the AI 26 is known to be unpredictable. The AI sensor 40 thus ensures compliance by 24/7/365 monitoring of the AI agents 22.

The artificial intelligence (or AI) monitoring service 48 protects against other attacks. Suppose a customer's AI agent 22 is attacked by an adversary. The attack tries to manipulate or force the AI agent 22 to execute a damaging or harmful outcome (such as the 2016 MICROSOFT® Tay chatbot). The AI sensor 40 detects the abnormal AI behavior 58 (such as inappropriate message inputs 28 and inappropriate message outputs 30) and disables or shuts down the AI agent 22. The AI sensor 40 may even identify the adversary using IP addressing and other techniques (as this disclosure will later explain). As another example, a malicious insider may configure or train the AI agent 22 to badly behave for intentional harm. The AI sensor 40 detects the abnormal AI behavior 58 and provides visibility of the chain of events leading up to the abnormal AI behavior 58. Because the AI sensor 40 detects the AI-powered malware 92 and remote attacks 94, the AI sensor 40 prevents a breach.

The AI sensor 40 may monitor any AI agent 22 applying the artificial intelligence (AI) 26. This disclosure mostly explains the AI agent 22 as the computer system 24 programmed to use the artificial intelligence 26. The AI agent 22, though, may be any device of any construction. That is, the AI agent 22 need not be a computer (with memory and storage), and the AI agent 22 need not use digital switching transistor devices. The AI sensor 40 may monitor any AI 26 applied by any device. The AI sensor 40, for example, may monitor the AI 26 applied to image recognition done directly by light impacting pixels in an image sensor (e.g., a photonic neural network). The AI sensor 40 may also monitor analog electronics used to implement neurons directly as a substrate (e.g., programmable resistors). The AI sensor 40 may monitor any AI 26 applied by any device, regardless of its construction or operation.

Figure 10:
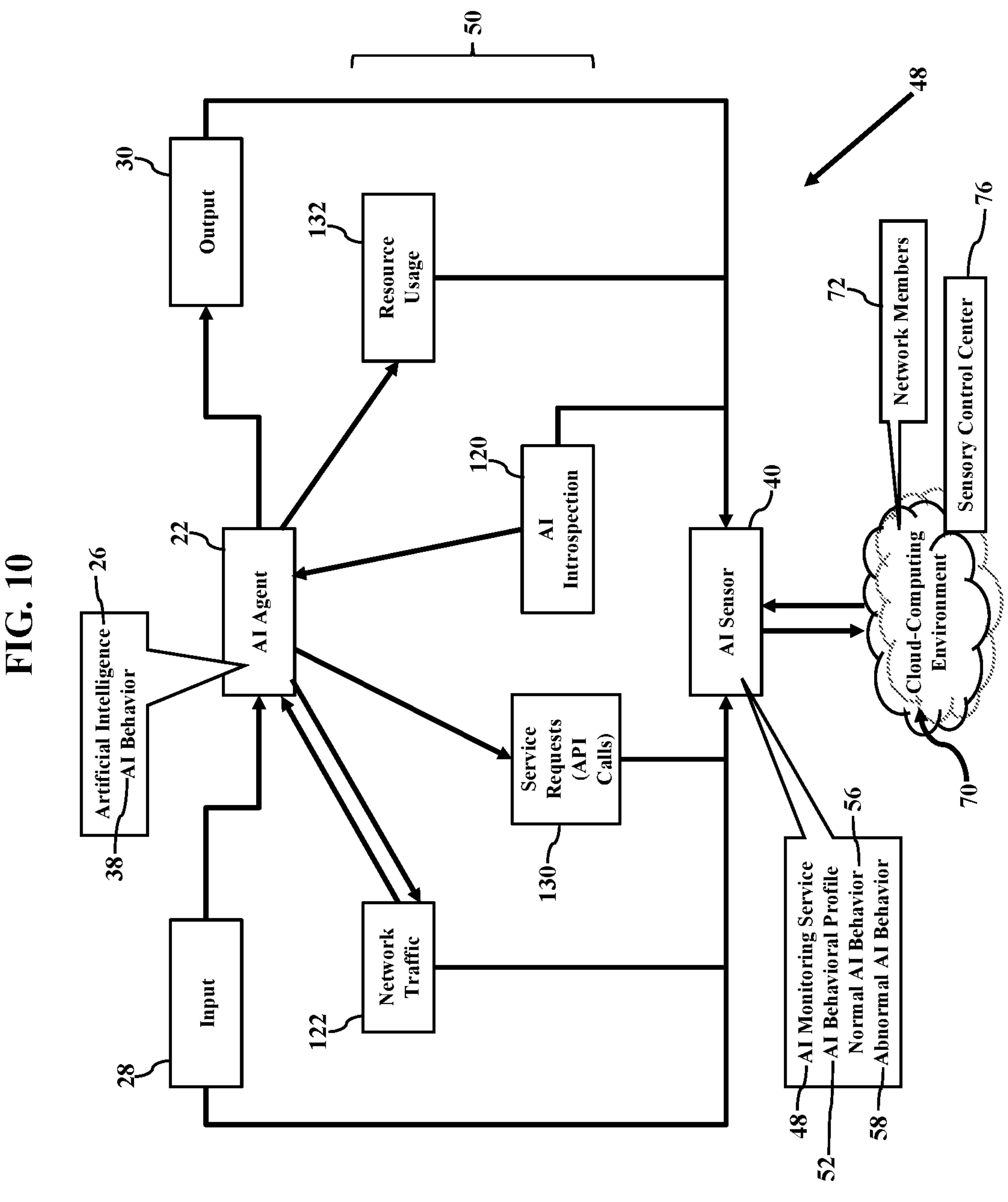

FIG. 10 illustrates more detailed examples of the artificial intelligence (or AI) monitoring service 48. The AI monitoring service 48 may observe and control the AI agent 22. As FIG. 10 illustrates, the AI monitoring service 48 may receive any information describing the input data 28 sent to or received by the AI agent 22. The AI agent 22 may send, forward, stream, or copy the input data 28 to the AI monitoring service 48 (such as the AI sensor 40). An originating sender device of the input data 28 may be programming to copy/stream the input data 28 to the AI sensor 40. The originating sender device of the input data 28 may first send the input data 28 to the AI sensor 40, thus allowing the AI sensor 40 to first intercept and evaluate the input data 28 before forwarding on to the AI agent 22. However the AI sensor 40 obtains the input data 28, the AI sensor 40 may forward or upload the input data 28 to the cloud-computing environment 70 for analysis. Regardless, the AI monitoring service 48 may compare the input data 28 to the AI behavioral profile 52. The AI behavioral profile 52 may describe or specify permissible/impermissible types of the input data 28. The AI behavioral profile 52 may also describe permissible/impermissible ranges/values of the input data 28. If the input data 28 satisfies the AI behavioral profile 52, then the AI monitoring service 48 may classify the AI behavior 38 as the normal AI behavior 58. However, if the input data 28 fails to satisfy the AI behavioral profile 52, then the AI monitoring service 48 may classify the AI behavior 38 as the abnormal AI behavior 58. The AI monitoring service 48 may flag the abnormal AI behavior 58 and implement early warning processes (such as the AI behavioral alert notification 60 and the threat procedures 62, as above explained) and/or alert downstream services for further investigation and/or response actions. The AI monitoring service 48 may thus be a very workload-focused solution to detect the abnormal AI behavior 58. The AI monitoring service 48 proactively monitors the AI agent 22 and stops the artificial intelligence 26 from implementing social/commercial/physical harms.

The AI monitoring service 48 may also monitor the output(s) 30 generated by the AI agent 22. The AI monitoring service 48 may receive or intercept the output 30. The AI agent 22 may send, forward, stream, or copy the output 30 to the AI monitoring service 48 (such as the AI sensor 40). The AI monitoring service 48 may compare the output 30 to the AI behavioral profile 52. The AI behavioral profile 52 may describe permissible/impermissible types, ranges, values, or decisions of the output 30. If the output 30 conforms to or satisfies the AI behavioral profile 52, then the AI monitoring service 48 may classify the AI behavior 38 as the normal AI behavior 56. However, if the output 30 fails to satisfy the AI behavioral profile 52, then the AI monitoring service 48 may classify the AI behavior 38 as the abnormal AI behavior 58. The AI monitoring service 48 may flag the abnormal AI behavior 58 and implement early warning processes (such as the AI behavioral alert notification 60 and the threat procedures 62, as above explained) and/or alert downstream services for further investigation and/or response actions. The AI sensor 40 proactively monitors the AI agent 22 and stops the artificial intelligence 26 from outputting rogue activity without requiring a priori knowledge threat patterns.

As FIG. 10 also illustrates, the AI monitoring service 48 may also utilize AI introspection datum or data 120. The AI introspection data 120 may be one of the AI behavioral activities 50 obtained by or utilized by the AI monitoring service 48. As the AI agent 22 executes and applies the artificial intelligence 26, the AI agent 22 may report real time, near-real time, or post-hoc explanatory statements, metadata, progress reports, or values while applying the artificial intelligence 26. The AI agent 22 may stream/report any processing tasks, software applications, instructions, interpretations, and/or decisional statements to the AI monitoring service 48. The AI introspection data 120 may be a continuous stream of data or periodic/random reports or updates. The AI introspection datum or data 120 reveals the inner processing and decision making being applied by the artificial intelligence 26. The AI introspection data 120 explains the artificial intelligence 26. The AI introspection data 120 may be sent from the AI agent 22 to the network address associated with the AI monitoring service 48 (such as the AI sensor 40). The AI monitoring service 48 may use the AI introspection data 120 for concurrent analysis and for pattern matching. The AI monitoring service 48 may combine the AI introspection data 120 with the input data 28, the output 30, and any other AI behavioral activities 50 to determine an AI Interpretability understanding of why the artificial intelligence 26 is making the decisions it's making.

The AI behavior 38 is determined. The AI monitoring service 48 may compare the AI introspection data 120 to the AI behavioral profile 52. The AI behavioral profile 52 may describe or specify permissible/impermissible explanatory statements, metadata, progress reports, or values. If the AI introspection data 120 satisfies the AI behavioral profile 52, then the AI monitoring service 48 may classify the AI behavior 38 as the normal AI behavior 56. If, however, the AI introspection data 120 fails to conform to or satisfy the AI behavioral profile 52, then the AI monitoring service 48 may determine the abnormal AI behavior 58. The AI monitoring service 48 may flag the abnormal AI behavior 58 and implement early warning processes (such as the AI behavioral alert notification 60 and the threat procedures 62, as above explained) and/or alert downstream services for further investigation and/or response actions.

As FIG. 10 illustrates, the AI monitoring service 48 may monitor network traffic 122 to/from the AI agent 22. As the AI agent 22 conducts packetized communications, the AI monitoring service 48 may read or intercept, in real time or in near-real time, incoming/outgoing packet headers in the HTTP portion. The AI agent 22 may be programmed to report any and/or all HTTP/HTTPS packet header data to the AI monitoring service 48 (such as the AI sensor 40). The AI agent 22 may be programmed to first send all data packets to the network address assigned to the AI monitoring service 48. The cloud computing environment 70 may be even programmed or instructed to first send or route all data packets to the AI monitoring service 48, thus allowing the AI monitoring service 48 to first intercept and analyze. The HTTP portion reveals network addresses (such as Internet Protocol addresses), Uniform Resource Locators, and other network resources. The AI monitoring service 48 may use deep packet inspection of the HTTP network traffic 122 conducted to/from/by the AI agent 22.

FIGS. 11-12 illustrate inter-container activities 124. The inter-container activities 124 may be examples of the network traffic 122 obtained by the AI monitoring service 48. As the AI agent 22 provides the containerized service 110 & **114*a*, the cloud service 110 may require other services provided by other containers 114*b* (such as a functional micro-service). FIG. 11 illustrates a co-hosted arrangement in which the AI agent 22 hosts different containers 114*a* and 114*b* providing different containerized services. FIG. 12, though, illustrates different containerized cloud services 110***a*/114*a* and 110*c*/114*c* hosted by different network members 22 and 72. The AI monitoring service 48 may thus read/inspect/intercept any inter-container messages and communications conducted between the different containers 114*a-c*.

The AI monitoring service 48 may determine the AI behavior 38 based on the network traffic 120. The AI agent 22 may report all packet headers to the AI monitoring service 48. The AI monitoring service 48 may even receive and inspect encrypted network traffic 122, such as by inspecting packet headers in HTTPS traffic (such as by using the extended Berkeley Packet Filter or eBPF) to extract and identify security observability data. The AI monitoring service 48 may obtain fine-grained details of calls and messages, even from encrypted network traffic 120. The AI monitoring service 48 may also obtain the network traffic 122 from a traffic log that records historical IP addresses, URLs, and other HTTP/HTTPS data and network resources. Whatever the network traffic 122, the AI monitoring service 48 may use the network traffic 122 to determine the AI behavior 38. The AI monitoring service 48 may compare the network traffic 122 to the AI behavioral profile 52. The AI behavioral profile 52 may describe or specify whitelist/blacklist IP addresses, URLs, and other HTTP/HTTPS data. If the network traffic 122 satisfies the AI behavioral profile 52, then the AI monitoring service 48 may classify the AI behavior 38 as the normal AI behavior 56. If, however, the network traffic 122 fails to conform to or satisfy the AI behavioral profile 52, then the AI monitoring service 48 may determine the abnormal AI behavior 58. The AI monitoring service 48 may flag the abnormal AI behavior 58 and implement early warning processes (such as the AI behavioral alert notification 60 and the threat procedures 62, as above explained) and/or alert downstream services for further investigation and/or response actions.

As FIG. 12 also illustrates, the AI monitoring service 48 may monitor network connections 126. The network connections 126 may be more examples of the network traffic 122 obtained by the AI monitoring service 48. As the AI agent 22 operates, the AI monitoring service 48 may monitor and inspect any incoming/outgoing inter-service/inter-container activities conducted to/from the AI agent 22. As the AI agent 22 operates, communications may be established with other network members, other containers, and/or other cloud services. For example, each network member, each container, and/or cloud service may be assigned to, and/or associated with, a unique cloud service identifier and an Internet Protocol address. As the AI agent 22 operates, the AI agent 22 may report these network connections 126 to the AI monitoring service 48 (such as the AI sensor 40). The AI monitoring service 48 may read, or generate, logs describing any data sent to, and any data received from, other network members, containers, and/or cloud services. The data may include their corresponding Internet Protocol addresses and/or cloud service identifiers. The AI monitoring service 48 may read or log inter-container and/or inter-host requests, responses, replies, events, activities, their corresponding Internet Protocol addresses, and/or cloud service identifiers. The AI monitoring service 48 may query and retrieve these inter-container Internet Protocol addresses and cloud service identifiers from cloud configuration data provided by AWS®, GOOGLE®, MICROSOFT®, or any other cloud-service provider.

The network traffic 122 and network connections 126 help distinguish the AI behavior 38. The network traffic 122 and network connections 126 allow the AI monitoring service 48 to classify IP addresses, hosts, containers, computers, and networks. Furthermore, the network traffic 122 and network connections 126 allow the AI monitoring service 48 to distinguish between a co-hosted or intra-container application or a public IP address. The AI monitoring service 48 may also use any Internet Protocol address and/or cloud service identifier to identify categories of services that may be the normal AI behavior 58 or the abnormal AI behavior 58. The AI monitoring service 48 may identify and/or classify the normal AI behavior 56 or the abnormal AI behavior 58 by monitoring intra-service/intra-container and inter-service/inter-container network traffic 122 and network connections 126. Any method or network data may be used to decide service identities.

Returning to FIG. 10, the AI monitoring service 48 may also monitor service requests 130. The service requests 130 may be another one of the AI behavioral activities 50 obtained by the AI monitoring service 48. As the AI agent 22 operates, the AI agent 22 may issue or send a service request 130 for a different cloud service (such as 110*b-c* illustrated in FIGS. 11-12). The different cloud service may be intra-container 114 (illustrated in FIGS. 11-12). More likely, though, the different cloud service is inter-container 114*b* or 114*c* (illustrated in FIGS. 11-12). The AI agent 22 may even receive the service request 130 from the network members 72 affiliated with the cloud computing environment 70. The service request 130 may identify or specify application programming interfaces ("APIs") for calling/requesting the cloud service. The cloud-computing environment 70, for example, may deploy thousands or even millions of different cloud micro-services 110. The cloud-computing environment 70 may thus correspondingly have thousands or even millions of different containers 114, with each container 114 providing a corresponding cloud micro-service 110. The AI agent 22 may be programmed to send, report, or copy each service request 130 and/or API call to the network address assigned to the AI monitoring service 48. The cloud computing environment 70 may be programmed or instructed to first send or route each service request 130 and/or API call to the AI monitoring service 48, thus allowing the AI monitoring service 48 to first intercept and analyze. The AI monitoring service 48 may thus monitor incoming/outgoing service requests 130 (such as API calls). By analyzing the incoming and outgoing API calls, the AI monitoring service 48 may identify the web resources called by the AI agent 22 and the corresponding service provider. Indeed, once the API call is determined, the AI monitoring service 48 may utilize publicly-available resources. For example, because the packet headers in the HTTP portion are visibly available, the AI monitoring service 48 may read the HTTP portion and identify the URL hosting the API resource. An IP reputation associated with the URL host may identify malicious threat actors. An API resource identification may reveal rogue communication attempts and/or rogue resource modifications.

The AI monitoring service 48 may distinguish between common and rare. When the AI monitoring service 48 obtains the service request 130 and/or API call, the AI monitoring service 48 may compare to a list, repository, or database of API calls. The AI monitoring service 48, and/or the cloud-computing environment 72, may include details regarding all, some, or commonly used API calls. These API details allow the AI monitoring service 48 to distinguish between common or legitimate calls and rare/suspicious calls. As a simple example, Amazon's AWS® offers hundreds of different API calls. The AI monitoring service 48 may retrieve fine details regarding all, or a popular or common subset, of these AWS® API calls. These fine details may be retrieved from cloud configuration data (such as those detailed in Amazon's AWS® specification) and provide a deep knowledge of the resource exposed by the API call (such as name, object, action). These fine details provide a rich-data description of the API calls associated with the AI agent 22.

The AI monitoring service 48 may determine the AI behavior 38. The AI monitoring service 48 may compare any data associated with the service request 130 to the AI behavioral profile 52. If the service request 130 conforms to permissible or whitelist activity, then the AI monitoring service 48 may classify the AI behavior 38 as the normal AI behavior 56. If, however, the data associated with the service request 130 indicates blacklist or unknown activity, then the AI monitoring service 48 may determine the abnormal AI behavior 58. The AI monitoring service 48 may flag the abnormal AI behavior 58 and implement early warning processes (such as the AI behavioral alert notification 60 and the threat procedures 62, as above explained) and/or alert downstream services for further investigation and/or response actions. The AI monitoring service 48 proactively monitors the service request 130 and stops the AI agent 22 from implementing the abnormal AI behavior 58.

FIG. 10 also illustrates resource usage reports 132. As the AI agent 22 operates, the AI agent 22 may issue, send, or stream the resource usage report 132 to the AI monitoring service 48 (such as the AI sensor 40). The resource usage report 132 may be another one of the AI behavioral activities 50 obtained by the AI monitoring service 48. While the resource usage report 132 may describe any hardware and memory resource accessible to the AI agent 22, the resource usage report 132 may describe the processes and/or tasks currently being performed/executed by the AI agent 22 and/or the artificial intelligence 26. The resource usage report 132 may describe any software applications currently being executed and their corresponding real time percentage utilization or consumption of hardware resources (e.g., the memory device 44 and the CPU/GPU/ASIC processor 46 illustrated in FIGS. 1-2)). The resource usage report 132 may also describe electrical power consumption associated with any software application or task or process (such as the artificial intelligence 26).

The AI monitoring service 48 may classify the AI behavior 38. The AI monitoring service 48 may compare any data specified by the resource usage report 132 to the AI behavioral profile 52. The AI behavioral profile 52, for example, may specify the filenames or other identifiers of whitelisted software applications that are predefined or associated with the normal AI behavior 56. The AI behavioral profile 52 may additionally or alternatively specify acceptable ranges or values of utilization or consumption that are associated with the normal AI behavior 56. The AI behavioral profile 52, however, may specify impermissible blacklisted filenames and/or unacceptable range/values of utilization or consumption that are associated with the abnormal AI behavior 58. If the resource usage report 132 conforms to the AI behavioral profile 52, then the AI monitoring service 48 may classify the AI behavior 38 as the normal AI behavior 56. If, however, the data associated with the resource usage report 132 fails to conform to the AI behavioral profile 52, then the AI monitoring service 48 may determine the abnormal AI behavior 58. The AI monitoring service 48 may flag the abnormal AI behavior 58 and implement early warning processes (such as the AI behavioral alert notification 60 and the threat procedures 62, as above explained) and/or alert downstream services for further investigation and/or response actions. The AI monitoring service 48 proactively monitors the resource usage report 132 and stops the AI agent 22 from spreading and from implementing socially/commercially/physically harmful actions, policies, or goals.

FIG. 13 illustrates more examples of a rich variety of AI behavioral detection techniques. Because the AI monitoring service 48 may utilize any of the AI behavioral activities 50 (as above explained with reference to FIG. 10), in any combination, the AI monitoring service 48 quickly determines a final verdict (e.g., the normal AI behavior 56 or the abnormal AI behavior 58) using the AI behavioral profile 52. FIG. 13 is not an exhaustive list of AI behavioral detection techniques, as an actual production pipeline architecture may contain a large database of rules values, ranges, and logical statements. FIG. 13 demonstrates, though, that a smaller or fewer amount of logical statements provides a meaningful and practical AI monitoring service 48.

The AI monitoring service 48 provides distributed protection. The AI sensor 40 may have a device-side software component that installs to endpoints (such as the virtual personal assistant 80 illustrated in FIG. 4). The AI sensor 40 may also have a network-side or member-side software component that installs to any of the network members 72 operating within the cloud-computing environment 70. Because the AI monitoring service 48 may be cloud-based, the AI monitoring service 48 interacts extensively with the AI sensors 40 in a real-time fashion. The AI sensor 40 relays behavioral indicators (such as the input data 28, them output 30, and the AI behavioral activities 50 above explained) to the cloud-computing environment 70. The cloud-computing environment 70 may thus perform addition detection techniques and provide additional cloud services. The cloud-computing component also stores data that can be used for the development and refinement of further detection techniques. The cloud-computing environment 70 may also correlate information from multiple AI sensors 40, thus providing a holistic view to human analysts for further evaluation.

The AI monitoring service 48 may implement any protective and preventative action. The AI sensor 40 may take preventative or protective actions based on the conclusions it makes, either solely or in conjunction with the cloud-computing component. The AI sensor 40 may disable or suspend the AI agent 22, or a subset of the AI agent's interactions, as necessary. The cloud-computing environment 70 may also be the control element for a global off switch, thus remotely disabling a group or subset of AI agents 22 in response to ongoing events. This can also be implemented as an authorization to run, where AI agents 22 self-disable or lose access to resources if the cloud-computing environment 70 does not continue to send authorization signals and/or encryption keys on a defined schedule.

Figure 14:
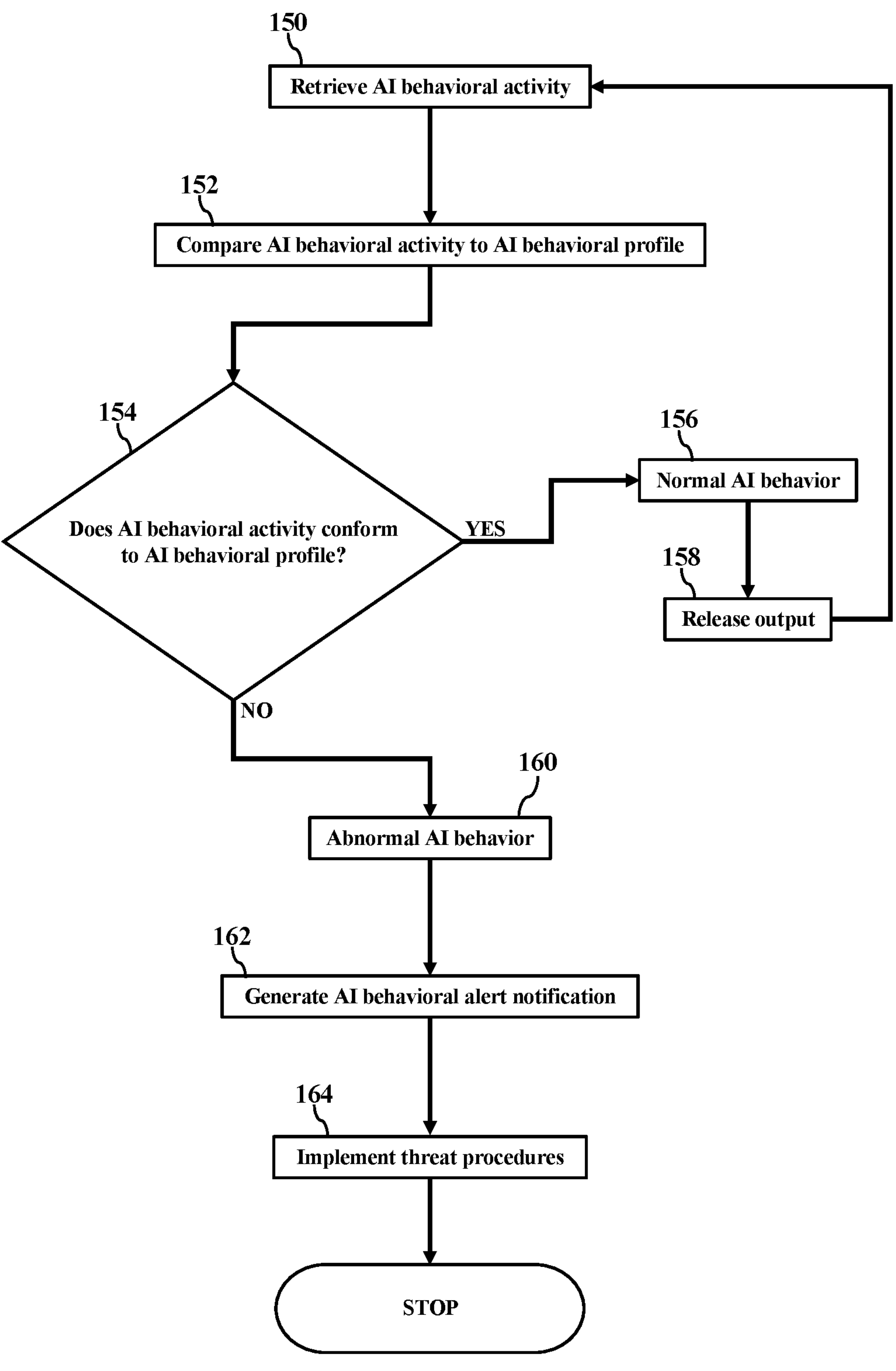
FIG. 14 illustrates examples of a method or operations for monitoring artificial intelligence.

FIG. 14 illustrates examples of a method or operations for monitoring the artificial intelligence (or AI) 26. The AI sensor 40 and/or the AI monitoring service 48 receives the AI behavioral activity 50 associated with the artificial intelligence 26 (Block 150). The AI behavioral activity 50 is compared to the AI behavioral profile 52 (Block 152). If the AI behavioral activity 50 matches, lies within, satisfies, or otherwise conforms to the AI behavioral profile 52 (Block 154), then AI behavioral activity 50 is determined to be the normal AI behavior 56 (Block 156). Any output 30, if held or quarantined, may be approved and released (Block 158). If, however, the AI behavioral activity 50 fails to conform to the AI behavioral profile 52 (Block 154), then the AI behavioral activity 50 is determined to be the abnormal AI behavior 58 (Block 160). The AI behavioral alert notification 60 is generated (Block 162) and the threat procedures 62 may be implemented (Block 164), such as disabling the artificial intelligence 26, reverting to the baseline/good state 63, and/or clearing the hardware processor's cache memory 68.

Figure 15:
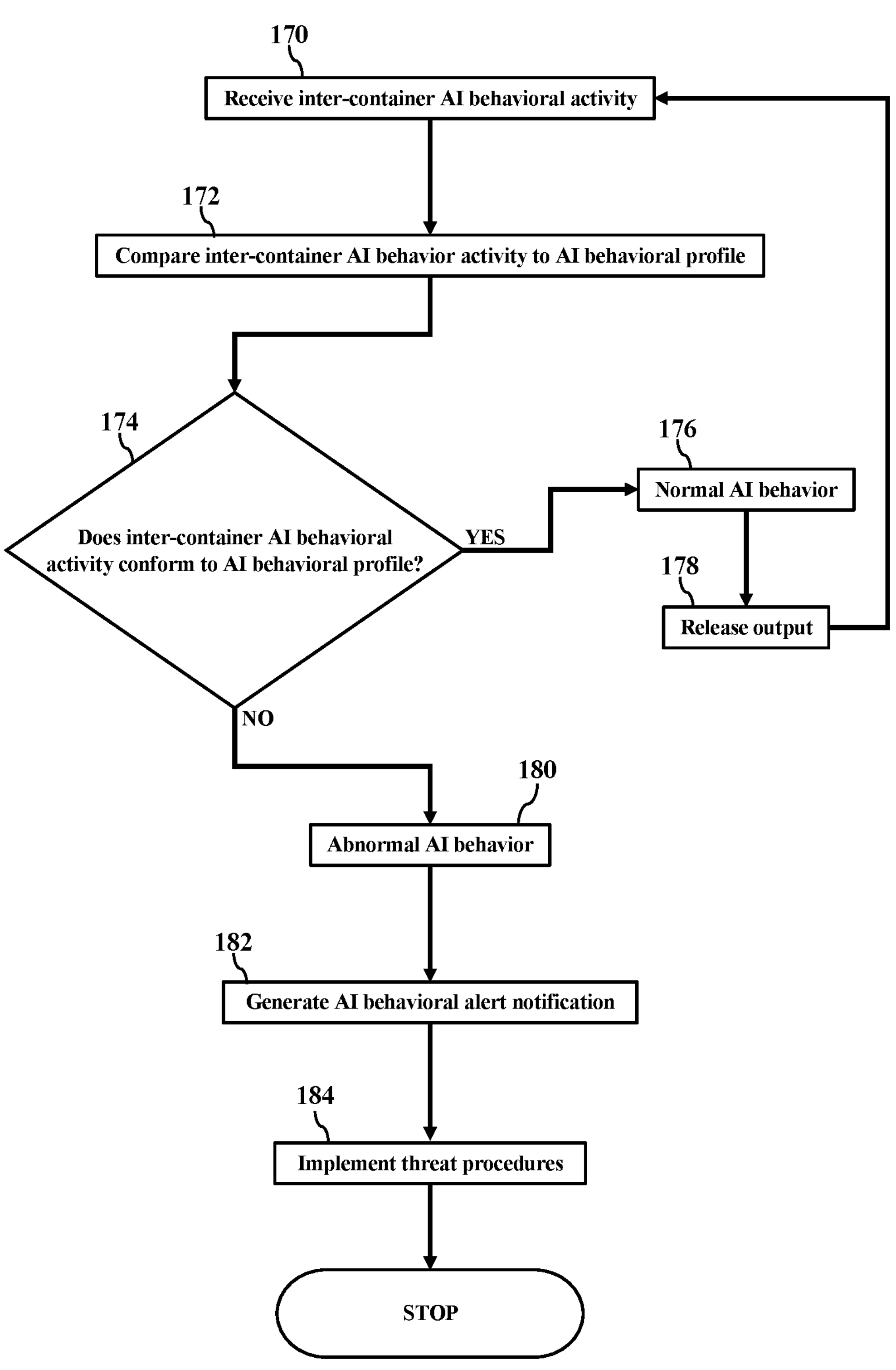
FIG. 15 illustrates examples of a method or operations for monitoring artificial intelligence.

FIG. 15 illustrates more examples of a method or operations for monitoring the artificial intelligence (or AI) 26. The inter-container AI behavioral activity 124 is received (Block 170) and compared to the AI behavioral profile 52 (Block 172). If the inter-container AI behavioral activity 124 conforms to the AI behavioral profile 52 (Block 174), then inter-container AI behavioral activity 124 is determined to be the normal AI behavior 56 (Block 176). Any output 30, if held or quarantined, may be approved and released (Block 178). If, however, the inter-container AI behavioral activity 124 fails to conform to the AI behavioral profile 52 (Block 174), then the inter-container AI behavioral activity 124 is determined to be the abnormal AI behavior 58 (Block 180). The AI behavioral alert notification 60 is generated (Block 182) and the threat procedures 62 may be implemented (Block 184), such as disabling the artificial intelligence 26, reverting to the baseline/good state 63, and/or clearing the hardware processor's cache memory 68.

The AI monitoring service 48 is client and service agnostic. The AI sensor 40, and the AI monitoring service 48, may monitor any artificial intelligence 26 applied by any cloud service 110 and/or by any container 114. The AI sensor 40, and the AI monitoring service 48, may be deployed as a network cloud resource to monitor any artificial intelligence 26, perhaps with little or no custom coding or implementation. The AI monitoring service 48 need only have access to the particular AI behavioral profile 52 that is predefined for the artificial intelligence 26. The AI monitoring service 48 may thus access a database that maps or associates different artificial intelligence 26 to different AI behavioral profiles 52. That is, once the AI sensor 40, or the AI monitoring service 48, identifies the artificial intelligence 26 being applied by the cloud service 110 and/or by the container 114 (perhaps by using unique identifiers), the AI sensor 40, or the AI monitoring service 48, need only perform a database lookup to determine the corresponding AI behavioral profile 52. The AI sensor 40 retrieves and loads the AI behavioral profile 52 for quick and simple behavioral comparisons. The AI sensor 40, and the AI monitoring service 48, may thus monitor many different applications of the artificial intelligence 26 applied by many cloud services 110 and/or by many containers 114. The AI monitoring service 48 is thus agnostic to the cloud service 110 and to the container 114, thus quickly adapting and implementing cloud service-specific, container-specific, and application-specific AI monitoring.

Figure 16:
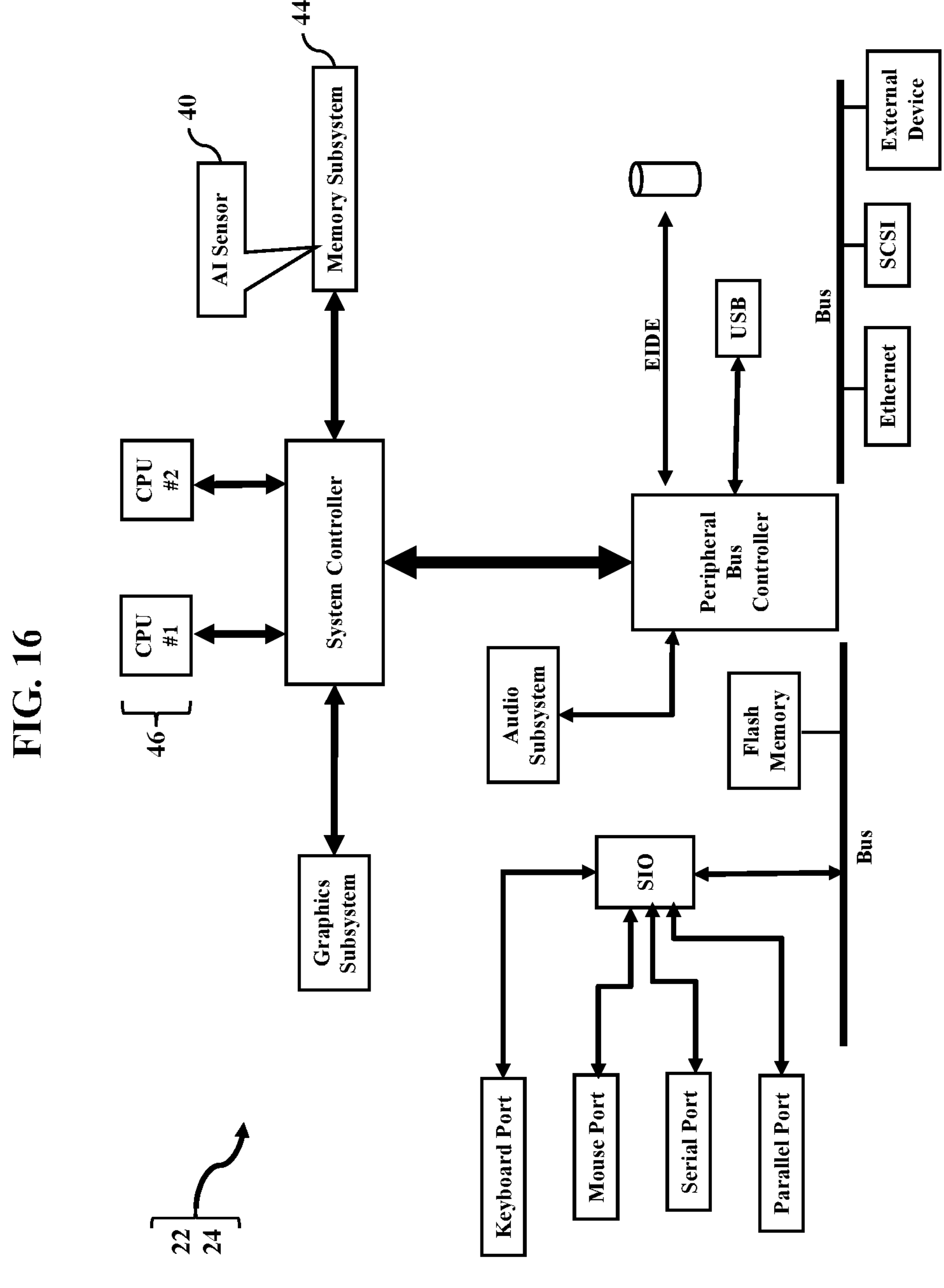
FIG. 16 illustrates a more detailed example of the operating environment.

FIG. 16 illustrates a more detailed example of the operating environment. FIG. 16 is a more detailed block diagram illustrating the computer system 24. The AI sensor 40 is stored in the memory subsystem or device 44. One or more of the processors 46 communicate with the memory subsystem or device 44 and execute the software application representing the AI sensor 40. Examples of the memory subsystem or device 44 may include Dual In-Line Memory Modules (DIMMs), Dynamic Random Access Memory (DRAM) DIMMs, Static Random Access Memory (SRAM) DIMMs, non-volatile DIMMs (NV-DIMMs), storage class memory devices, Read-Only Memory (ROM) devices, compact disks, solid-state, and any other read/write memory technology. Because the computer system 24 is known to those of ordinary skill in the art, no detailed explanation is needed.

The computer system 24 may have any embodiment. As this disclosure explains, the computer system 24 may be embodied as the server 90, the smartphone 100, or the laptop 102. The computer system 24, though, may be embodied as a tablet computer, a smartwatch, a television, an audio device, a remote control, and a recorder. The AI sensor 40 may also be easily adapted to still more smart appliances, such as washers, dryers, and refrigerators. Indeed, as cars, trucks, and other vehicles grow in electronic usage and in processing power, the AI sensor 40 may be easily incorporated into any vehicular controller.

The above examples of the AI sensor 40 may be applied regardless of the networking environment. The AI sensor 40 may be easily adapted to stationary or mobile devices having wide-area networking (e.g., 4G/LTE/5G cellular), wireless local area networking (WI-FI®), near field, and/or BLUETOOTH® capability. The AI sensor 40 may be applied to stationary or mobile devices utilizing any portion of the electromagnetic spectrum and any signaling standard (such as the IEEE 802 family of standards, GSM/CDMA/TDMA or any cellular standard, and/or the ISM band). The AI sensor 40, however, may be applied to any processor-controlled device operating in the radio-frequency domain and/or the Internet Protocol (IP) domain. The AI sensor 40 may be applied to any processor-controlled device utilizing a distributed computing network, such as the Internet (sometimes alternatively known as the "World Wide Web"), an intranet, a local-area network (LAN), and/or a wide-area network (WAN). The AI sensor 40 may be applied to any processor-controlled device utilizing power line technologies, in which signals are communicated via electrical wiring. Indeed, the many examples may be applied regardless of physical componentry, physical configuration, or communications standard(s).

The computer system 24 (and the network members 72) may utilize any processing component, configuration, or system. For example, the AI sensor 40 may be easily adapted to any desktop, mobile, or server central processing unit, graphics processor, ASIC, or chipset offered by INTEL®, ADVANCED MICRO DEVICES®, ARM®, APPLE®, TAIWAN SEMICONDUCTOR MANUFACTURING®, QUALCOMM®, or any other manufacturer. The computer system 24 may even use multiple central processing units or chipsets, which could include distributed processors or parallel processors in a single machine or multiple machines. The central processing unit or chipset can be used in supporting a virtual processing environment. The central processing unit or chipset could include a state machine or logic controller. When any of the central processing units or chipsets execute instructions to perform "operations," this could include the central processing unit or chipset performing the operations directly and/or facilitating, directing, or cooperating with another device or component to perform the operations.

The AI sensor 40 may inspect packetized communications. When the computer system 24 communicates via the communications network 74, information may be collected, sent, and retrieved. The information may be formatted or generated as packets of data according to a packet protocol (such as the Internet Protocol). The packets of data contain bits or bytes of data describing the contents, or payload, of a message. A header of each packet of data may be read or inspected and contain routing information identifying an origination address and/or a destination address.

The communications network 74 may utilize any signaling standard. The cloud computing environment 70 may mostly use wired networks to interconnect the network members 72. However, the communications network 74 and the cloud computing environment 70 may utilize any communications device using the Global System for Mobile (GSM) communications signaling standard, the Time Division Multiple Access (TDMA) signaling standard, the Code Division Multiple Access (CDMA) signaling standard, the "dual-mode" GSM-ANSI Interoperability Team (GAIT) signaling standard, or any variant of the GSM/CDMA/TDMA signaling standard. The communications network 74 and the cloud computing environment 70 may also utilize other standards, such as the I.E.E.E. 802 family of standards, the Industrial, Scientific, and Medical band of the electromagnetic spectrum, BLUETOOTH®, low-power or near-field, and any other standard or value.

The AI sensor 40 and the AI monitoring service 48 may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for monitoring the artificial intelligence 26, as the above paragraphs explain.

The diagrams, schematics, illustrations, and the like represent conceptual views or processes illustrating examples of cloud services malware detection. The functions of the various elements shown in the figures may be provided through the use of dedicated hardware as well as hardware capable of executing instructions. The hardware, processes, methods, and/or operating systems described herein are for illustrative purposes and, thus, are not intended to be limited to any particular named manufacturer or service provider.

As used herein, the singular forms "a," "an," and "the" are intended to include the plural forms as well, unless expressly stated otherwise. It will be further understood that the terms "includes," "comprises," "including," and/or "comprising," when used in this Specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, and so on, may be used herein to describe various elements, these elements should not be limited by these terms. These terms are only used to distinguish one element from another. For example, a first computer or container could be termed a second computer or container and, similarly, a second device could be termed a first device without departing from the teachings of the disclosure.

The invention claimed is:

1. A method that monitors an artificial intelligence (AI), comprising:

intercepting, by an endpoint AI sensor monitoring a host device, an AI output generated by the artificial intelligence;

quarantining, by the endpoint AI sensor, the AI output to a host memory device;

determining, by the endpoint AI sensor, that the AI output fails to conform to an AI output boundary; and in response to the determining that the AI output fails to conform to the AI output boundary, deleting, by the endpoint AI sensor, the AI output quarantined in the host memory device.

2. The method of claim 1, wherein in response to the determining that the AI output fails to conform to the AI output boundary, further comprising at least one of disabling the artificial intelligence or reverting the artificial intelligence to a stored state.

3. The method of claim 1, further comprising receiving at least one of a packet header data associated with the artificial intelligence or a Uniform Resource Locator associated with the artificial intelligence.

4. The method of claim 1, wherein the receiving of the AI output further comprising receiving at least one of a network connection, a cloud service identifier, or an Internet Protocol address associated with the artificial intelligence.

5. The method of claim 1, further comprising receiving a service request associated with the artificial intelligence.

6. The method of claim 1, further comprising receiving an AI introspection datum provided by the artificial intelligence.

7. The method of claim 1, further comprising receiving a resource usage report associated with the artificial intelligence.

8. The method of claim 1, further comprising receiving an input associated with the artificial intelligence.

9. The method of claim 1, further comprising:

determining that the AI output conforms to the AI output boundary; and releasing the AI output quarantined in the host memory device.

10. A computer that monitors an artificial intelligence (AI), comprising:

at least one central processing unit; and at least one memory device storing instructions that, when executed by the central processing unit, perform operations, the operations comprising:

receiving, by an endpoint AI endpoint sensor, an AI output generated by a host AI containerized service in a cloud-computing environment;

quarantining, by the endpoint AI sensor, the AI output generated by the host AI containerized service in a host memory device;

comparing, by the endpoint AI sensor, the AI output to an AI behavioral profile specifying an AI output boundary associated with a normal AI behavior;

determining, by the endpoint AI sensor, that the AI output fails to conform to the AI output boundary specified by the AI behavioral profile; and in response to the AI output failing to conform to the AI output boundary specified by the AI behavioral profile, deleting, by the endpoint AI sensor, the AI output quarantined in the host memory device.

11. The computer of claim 10, wherein the operations further comprise at least one of disabling the artificial intelligence or reverting the artificial intelligence to a stored state.

12. The computer of claim 10, wherein the operations further comprise receiving at least one of a packet header data associated with the artificial intelligence or a Uniform Resource Locator associated with the artificial intelligence.

13. The computer of claim 10, wherein the operations further comprise receiving at least one of a network connection, a cloud service identifier, or an Internet Protocol address associated with the artificial intelligence.

14. The computer of claim 10, wherein the operations further comprise receiving a service request associated with the containerized service.

15. The computer of claim 10, wherein the operations further comprise receiving an AI introspection datum provided by the artificial intelligence.

16. The computer of claim 10, wherein the operations further comprise receiving a resource usage report associated with the artificial intelligence.

17. The computer of claim 10, wherein the operations further comprise receiving an input associated with the artificial intelligence.

18. The computer of claim 10, wherein the operations further comprise:

determining that the AI output conforms to the AI output boundary specified by the AI behavioral profile; and releasing the quarantining of the AI output generated by the artificial intelligence.

* * * * *